United States Patent
Bearman et al.

(10) Patent No.: US 8,595,161 B2
(45) Date of Patent: Nov. 26, 2013

(54) METHOD AND SYSTEM FOR DETERMINING A POTENTIAL RELATIONSHIP BETWEEN ENTITIES AND RELEVANCE THEREOF

(75) Inventors: Michael Bearman, Silver Spring, MD (US); Carrie Stein, Bethesda, MD (US)

(73) Assignee: Vecna Technologies, Inc., Cambridge, MA (US)

( * ) Notice: Subject to any disclaimer, the term of this patent is extended or adjusted under 35 U.S.C. 154(b) by 1017 days.

(21) Appl. No.: 12/423,507

(22) Filed: Apr. 14, 2009

(65) Prior Publication Data

US 2009/0265106 A1    Oct. 22, 2009

Related U.S. Application Data

(63) Continuation-in-part of application No. 11/433,413, filed on May 12, 2006, now abandoned.

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC ........................................................ 706/17

(58) Field of Classification Search
None
See application file for complete search history.

(56) References Cited

U.S. PATENT DOCUMENTS

| | | | |
|---|---|---|---|
| 6,838,992 B2 | 1/2005 | Tenarvitz | |
| 6,917,291 B2 | 7/2005 | Allen | |
| 7,009,495 B2 | 3/2006 | Hughes | |
| 7,016,307 B2 | 3/2006 | Vasudev | |
| 2003/0163351 A1 | 8/2003 | Brown et al. | |
| 2004/0024612 A1 | 2/2004 | Gerntholtz | |
| 2004/0073459 A1 | 4/2004 | Barthell | |
| 2004/0122705 A1 | 6/2004 | Sabol et al. | |
| 2004/0122790 A1 | 6/2004 | Walker et al. | |
| 2004/0236604 A1 | 11/2004 | McNair | |
| 2005/0101841 A9 | 5/2005 | Kaylor et al. | |
| 2005/0143916 A1 | 6/2005 | Kim | |
| 2005/0187797 A1 | 8/2005 | Johnson | |
| 2005/0197846 A1 | 9/2005 | Pezaris | |
| 2006/0036619 A1 | 2/2006 | Fuerst et al. | |
| 2006/0085227 A1 | 4/2006 | Rosenfeld et al. | |
| 2006/0155581 A1 | 7/2006 | Eisenberger et al. | |
| 2006/0168043 A1 | 7/2006 | Eisenberger et al. | |
| 2006/0178910 A1 | 8/2006 | Eisenberger et al. | |
| 2006/0287906 A1 | 12/2006 | McGillin | |
| 2006/0294086 A1 | 12/2006 | Rose et al. | |
| 2007/0073748 A1* | 3/2007 | Barney .......................... 707/101 |
| 2007/0118399 A1 | 5/2007 | Avinash et al. | |

(Continued)

OTHER PUBLICATIONS

Murata et al. "Link Prediction of Social Networks Based on Weighted Proximity Measures", 2007, web Intelligence, pp. 85-88.*

(Continued)

*Primary Examiner* — Li-Wu Chang
(74) *Attorney, Agent, or Firm* — Albert J. Brunett

(57) ABSTRACT

A method and system for identifying a relevance of a relation between at least two entities includes receiving at least one item of information relating to one or more of the entities and determining whether a proximity between the at least two entities exists. A level of the proximity between the entities is identified. The relevance of the proximity between the entities is determined based on the level of the proximity and the at least one item of information received.

13 Claims, 19 Drawing Sheets

(56) References Cited

U.S. PATENT DOCUMENTS

2007/0156344 A1 7/2007 Sender et al.
2007/0168533 A1 7/2007 Canright et al.
2010/0256948 A1* 10/2010 Wright .......................... 702/150

OTHER PUBLICATIONS

Mtibaa et al. "Are You Moved by Your Social Network Application?", WOSN, 2008, pp. 67-72.*

Newman "Spread of epidemic disease on networks", physical review E 66, 2002, pp. 11.*

Eubank et al. "Modelling disease outbreaks in realistic urban social networks", Nature, vol. 429, 2004, pp. 180-184.*

Colizza et al. "The role of the airline transportation network in the prediction and predictability of global epidemics", PNAS, 2005, pp. 2015-2020.*

M.E.J. Newman, "A Measure of Betweenness Centrality Based on Random Walks," Jan. 2005, Social Networks, vol. 27, No. 1, pp. 39-54.

D. Zeng, H. Chen, L. Tseng, C. Larson, M. Eidson, I. Gotham, C. Lynch and M. Ascher, "Toward a national infectious disease information infrastructure: A case study in West Nile Virus and Botulism," in Proc. 5th Annu. Nat. Conf. Digital Goverment Research Seattle, WA, May 2004, pp. 45-54.

L.C. Freeman, "Visualizing Social Networks," Journal of Social Structure, vol. 1, last accessed at <http://www.cmu.edu/joss/content/articles/volume1/Freeman.html> on May 6, 2009, pp. 21.

S. Eubank, H. Guclu, V.S.A. Kumar, M.V. Marathe, A. Srinivasan, Z. Toroczkai and N. Wang, "Modeling Disease Outbreaks in Realistic Urban Social Networks," Los Alamos National Laboratory, Rensselaer Polytechnic Institute, University of Maryland, last accessed at <http://www.mcc.uiuc.edu/nsfitr04Rev/presentations/0113049_Modelling_disease.pdf> on May 6, 2009, p. 1.

R.A. Hanneman and M. Riddle, "Introduction to social network methods—Chapter 10: Centrality and power," last accessed at <http://www.faculty.ucr.edu/~hanneman/nettext/C10_Centrality.html> on May 6, 2009, pp. 26.

* cited by examiner

METHOD AND SYSTEM FOR DETERMINING A POTENTIAL RELATIONSHIP BETWEEN ENTITIES AND RELEVANCE THEREOF

CROSS-REFERENCE TO RELATED APPLICATION

This application is a Continuation-in-Part of U.S. patent application Ser. No. 11/433,413, filed May 12, 2006, now abandoned and entitled, An Infectious Disease Representation, Surveillance and Analysis Data Processing System Including a Visualization System Therefore, the entire disclosure of which is incorporated herein by reference.

BACKGROUND

The present disclosure relates generally to a method and system for determining whether a relationship may exist between two entities and more particularly to such a method and system where once a relationship is established the relevancy of the relationship can be addressed for a number of reasons.

BRIEF SUMMARY

A method and system for determining the possible relation between at least two entities is disclosed. In an embodiment, one or more items of information with regard to the at least two entities is gathered. Based on the items of information, a determination is made with regard to whether the at least two entities have been in proximity to each other and if so, the level of proximity. Once a level of proximity is determined, the relevancy of the level of proximity is determined.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
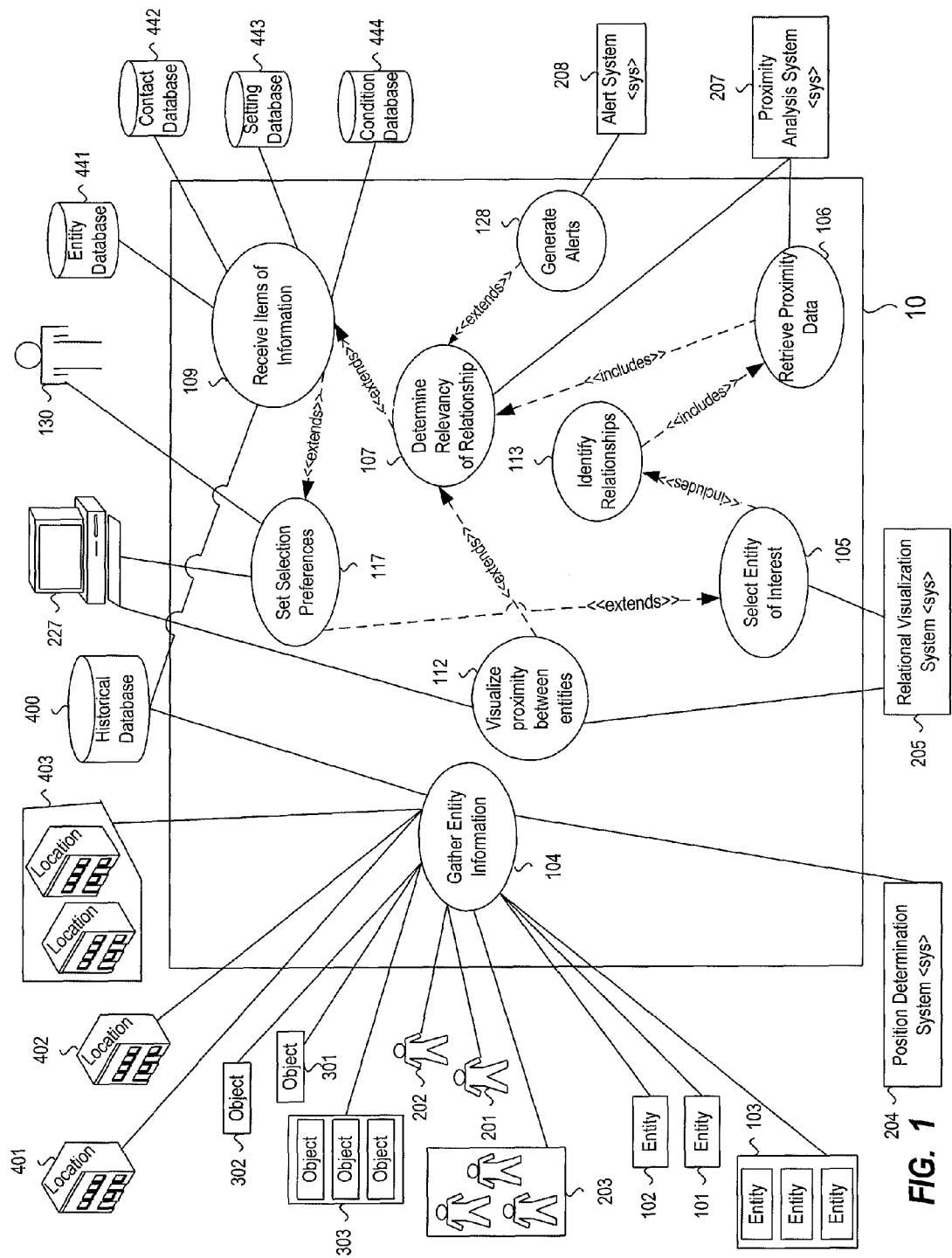
FIG. 1 is a use case diagram of an interaction tracking surveillance system in accordance with one embodiment of the present disclosure.

Certain terminology is used herein for convenience only and is not to be taken as a limitation on the present disclosure. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the relationship relevancy system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments.

Briefly stated, the present disclosure generally relates to identifying the relevance of relations between entities, and to tracking and/or predicting outcomes using data corresponding to relationships between entities. Thus, the multiple embodiments of the present disclosure include a method and system of monitoring and tracking location and movement of entities, determination of relationships and/or interactions between entities, and determining the relevance and the impact of those relationships. More specifically, the present disclosure relates to a relationship relevancy system and method that determines and tracks the position of entities in or around the system and the time at which the entities are at that position.

Briefly, in use, one or more of the entities are selected and potential relationships with other entities are identified. Proximity data relating to the identified relationships is synthesized to determine proximity level and/or an "intimacy score" (indicating the strength of the relationship based on a weighting of components of the proximity). Based on the proximity data and/or intimacy scores for the corresponding relationship(s), the relevancy of such relationships is determined.

That is, relationships between and among the entities in the system are analyzed and synthesized to determine their actual or potential current or future impact on other entities in or around the system, projected behavior of entities, evaluation of behavior (e.g., crossing of thresholds) of certain entities, and deviation of such behavior. Depending on determined relevancies and/or desired thresholds, an alert or the like may be triggered related to the relationships. Additionally, the proximity and relationship data can be visually presented, allowing a user interacting with the system to visualize the relationships and optionally to edit the information displayed, or to otherwise adjust the configuration preferences, selected entities of interest, visually track the relevant information pertaining to the relationships and/or identify additional relationships.

For convenience, the multiple embodiments of the present method and system and examples with respect thereto are described herein generally with reference to interactions related to medicine and/or that would take place in medical settings, such as a hospital, doctor's office, a laboratory, etc., including, for example, examining the interactions between people to identify the source of a disease outbreak or for determining whether transmission of a disease (e.g., bacteria or virus or hospital acquired infection (HAI)) has likely occurred to one or more other entities based on interactions between one entity and other subsequent and prior entities with whom that entity has been in contact. However, those skilled in the art will recognize that the multiple embodiments of the present disclosure are generally applicable to other types of interactions and settings relevant to tracking or monitoring the relationship(s) between entities and/or the relevance thereof, including, for example, tracking interactions between guards and inmates in a prison setting, tracking various objects to prevent theft or tampering of the objects, tracking soldiers on a battlefield, military base or foreign soil (e.g., when a soldier is absent or missing), monitoring the movement of transportation vehicles (e.g., aircraft, ships, automobiles, etc.) to prevent collisions and to detect deviations from flight plans, monitoring animals on a farm or within a distribution system, monitoring consumer goods such as food and other products, monitoring presence or movement of entities on a university or college campus or cruise ship, monitoring consumer purchase and/or behavior activities, guarding access to trade secrets, tracking and monitoring the movement of weapons and munitions, tracking the movement of repairmen or entities who are visitors within a tracked system, monitoring the activities of employees, monitoring and tracking movement of emergency response personnel, monitoring movement of entities in law enforcement settings generally (including, for example drug distribution and terrorism or terrorist cell activities), monitoring entities within a disaster area, tracking the online activities of a user, and predicting behavior and detecting deviations from predicted behavior.

Figure 17:
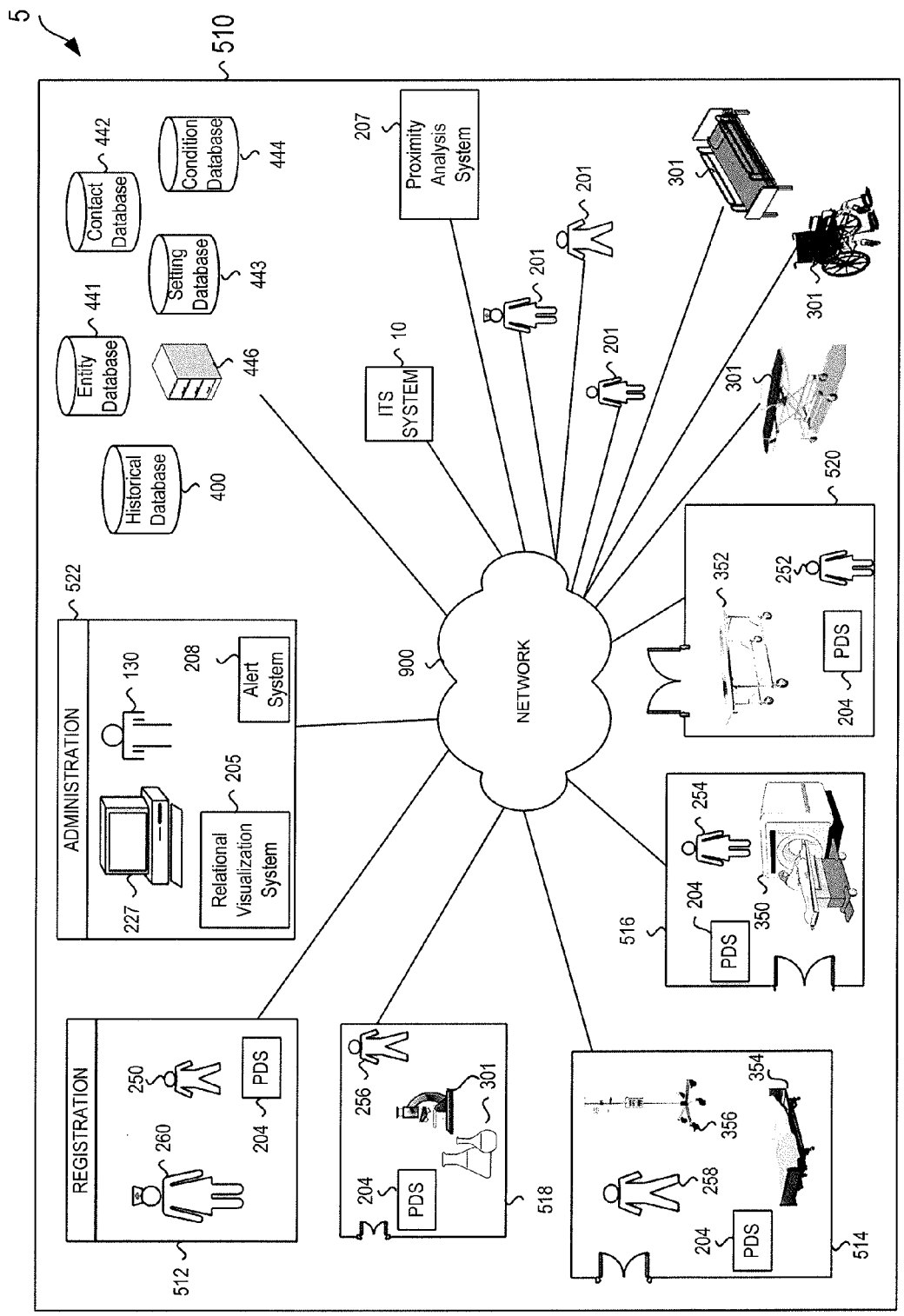
FIG. 17 is a network diagram of a relationship relevancy system in accordance with one embodiment of the present disclosure.

Referring to FIG. 17, a network diagram of a relationship relevancy system 5 in accordance with an embodiment of the present disclosure is shown. As noted above, for purposes of describing herein the embodiments of the present disclosure, the relationship relevancy system 5 of FIG. 17 is described with reference to a hospital setting. The relationship relevancy system 5 may thus be employed by, be resident in or otherwise determine, track and/or monitor the location, movement, relationships and/or interactions of entities in a hospital such as people, equipment, rooms and the like as described in greater detail below. The relationship relevancy system 5 may determine the relevancy of such relationships and/or interactions between those entities and the actual or predicted effect of those relationships (or movement of such entities) on other entities in the hospital or on the hospital as a whole. The predicted deviation of behavior of entities in the hospital can also be determined.

Thus, if an infection outbreak occurs, for example, rather than provide antibiotics to or for everyone in the hospital and/or shut down and sanitize all rooms and equipment, only specific people need be given antibiotics and specific rooms and specific equipment needs to be sanitized to isolate and prevent further spread of the disease. This results in a tremendous cost savings for the hospital. Of course, numerous other advantages are realized by users of the system both within and outside a hospital setting.

In FIG. 17 the relationship relevancy system 5 is illustrated as being employed in a hospital 510 that includes an interaction and tracking surveillance system (ITS system) 10, a position determination system (PDS) 204, proximity analysis system (PAS) 207, various people 201, 250, 252, 254, 256, 258, 260, and objects or equipment generally designated 301 all in our around a variety of different locations, areas, rooms wings, wards, departments, etc. As described in detail herein, the ITS 10 with or without the PDS 204 tracks the location of entities such as people, areas, equipment and the like while the PAS 207 (along with other systems) determines if a potential relationship may exist between the entities and if so, what level of response may be required.

In FIG. 17, the hospital 510 includes a registration area 512 (e.g., main registration or emergency room registration, etc.), patient room 514, MRI services area 516, laboratory testing area 518, and a surgical suite 520, among other areas. Each of the locations 512, 514, 516, 518, 520 as well as other areas of the hospital 510 may be interacted with by one or more persons generally designated 201 (e.g., doctors, patients, nurses, janitorial staff, etc.) or objects 301 (e.g., hospital equipment, such as beds, stretchers, EKG machines, IV carts, MRI machines, food carts and trays, drugs, etc.), such that relations and interactions between and among the various persons, objects and locations potentially impacts other individuals, objects and locations in the hospital.

For example, an infected patient 250 infected with an airborne communicable disease entering the hospital in the registration area 512 may be sent to the MRI services area 516, where he comes in contact with the MRI machine 350 and the MRI technician 254. After leaving the MRI services area 516, the infected patient travels the halls (not shown) of the hospital 510 to his room 514 where he comes into proximity with a nurse and/or doctor 258, and touches his bed 354 and IV cart 356. In addition, the infected patient's blood is sent to the laboratory 518 for analysis, where the lab technician 256 contacts the blood.

A second patient 252 enters the MRI machine 350 after the infected patient 250 departs. Subsequently, the second patient 252 has surgery in the surgical suite 520 on an operating table 352. Thus, by moving around the hospital 510, the infected patient 250 has come into proximity (thereby establishing a relationship) with the various locations, persons and objects. The effect or relevance of the relationships and proximity of the infected person 250 to these entities is that the other persons, objects and areas may themselves contract the airborne disease and/or help spread the disease to others that they subsequently come into proximity with.

The movement of the infected person 250, other persons and objects in and around the hospital 510 may be determined in any number of ways including by the PDS 204. As discussed in greater detail below, depending on the implementation, the PDS 204 (or elements thereof) may be located in one or more areas of the hospital 510.

The relationship relevancy system 5 may include an interaction and tracking surveillance system (ITS system) 10 that interacts with the PDS 204 and other components of the relationship relevancy system 5 to identify relationships and proximities of entities in the hospital and determine the relevancy of such relationships. The ITS system 10 may be located within the hospital 510 or at a remote location. The ITS system 10 may be controlled and operated by a user 130 (e.g., in an administration department 522) or in some other location in the hospital 510.

The ITS system 10 interacts with a proximity analysis system 207 to determine the level of proximity of the identified relationships among the entities. In the example of FIG. 17, the infected patient 250 came into proximity with the registration area 512, the nurse 260 in the registration area 512, the MRI services area 516, the MRI machine 350, the MRI technician 254, the room 514, a doctor 258, the bed 354 and the IV cart 356. In addition, his blood contacted the laboratory 518 and the lab technician 256. However, the effect of such proximities may vary depending on the level of proximity the infected person 250 had with each of these entities. That is, the infected person 250 may have been intimately involved with the MRI machine 350, the bed 354 and the doctor 258 (e.g., physical contact or moderate to close distance for a relatively long period of time), thereby resulting in a high level of proximity with these entities. In contrast, the infected person 250 may have been nominally involved with the MRI technician 254, the nurse 260 and the IV cart 356 (e.g., fleeting contact or merely passing distances for short periods of time), resulting in a low level of proximity with these entities.

Based on the determined levels of proximity as well as information (e.g., the particular disease identified, information specific to that disease, treatment of the disease, etc.) obtained from one or more information sources, including historical database 400, entity database 441, contact database 442, setting database 443, condition database 444 and traditional file system 446, the ITS system 10 determines the effect or relevancy of the relationships of the infected patient 250. For example, because the communicable disease of the infected patient 250 is primarily transmitted by air, and generally in instances where there is repeated or lengthy exposure, the effect of the infected patient's relationship with the doctor 258 (i.e., where there was a high level of proximity) may be significant.

Thus, the ITS system 10 may declare that the doctor 258 is likely contaminated and/or that the doctor 258 is a carrier and that other persons 102 that the doctor 258 has a relationship with (e.g., the second patient 252 or the laboratory technician 256) are also at high risk for contracting the communicable disease of the infected patient 250 (even though the infected patient 250 may not have had a direct relationship with such entities). In contrast, even though the infected patient 250 has a high level of proximity with the MRI machine 350, based on information about the communicable disease, the ITS system 10 may determine that the relevance of such relationship is insignificant (e.g., the MRI machine 350 is unlikely to transmit an airborne disease). Similarly, although the MRI technician 254 could contract or carry the communicable disease, the infected patient's level of proximity with the MRI technician 254 is low enough that there is little or only moderate significance to such relationship.

When the system of the present disclosure is employed in a hospital, for example, the lab 518 is often (but not always) the first department to know about a potential outbreak of a disease or infection, including an HAI. If so, the lab 518 can initiate an alert and various people, equipment and rooms are identified for further treatment or action. Additionally, the lab 518 may test the specific strain of the disease or infection for its resistance to antibiotics or disinfectants and if possible can instruct the usage of a more cost effective antibiotic or disinfectant or the like.

The user 130 may manage the ITS system 10 and receive output from the ITS system 10, including alerts generated by an alert system 208 to warn hospital staff of a possible infectious disease outbreak, security breach or other notable condition. Such alerts may be presented, for example, in the administration department 522 or in other relevant locations in the hospital 510. In addition, a relational visualization system 205 (described in greater detail below) may present the relationship, level of proximity and relevancy information regarding the relationships to the operator 130 or other user of the relationship relevancy system 5 on a display device 227. The relational visualization system 205 may also allow the operator 130 to interact with the ITS system 10 to select relationships of interest or provide additional information about those relationships.

In this manner the relationship relevancy system 5 is able to generally monitor and track the movement of entities in and around the hospital 510 and determine the spread of infectious diseases or other conditions of interest to other areas of the hospital 510 (e.g., from the emergency room to a maternity ward) or to other entities associated with the hospital 510 (e.g., from a patient to a doctor, from a patient to another patient via a piece of hospital equipment, from one visitor to another by virtue of being in the hospital at or nearly at the same time, etc.). The relationship relevancy system 5 may also predict the occurrence of a transfer or outbreak (e.g., based on the number of entities that may have had a relationship with an infected entity and the movement of those entities), determine behavior patterns or profiles of entities in the system (e.g., accumulate a knowledge base of typical activities and movement patterns for doctors, staff and/or certain pieces of equipment), and predict deviations from that behavior or profile (e.g., detect unauthorized access by hospital staff is the staff is not typically in a particular area or lingers too long, etc.).

Interaction and Tracking Surveillance System

Referring to FIG. 1, a use-case diagram of the interaction and tracking surveillance system 10 in accordance with the relationship relevancy system 5 and the present disclosure is shown. The ITS system 10 includes a gather entity information use case 104 that interacts with a number of entities 101, 102, 103, 201, 202, 203, 301, 302, 303 in or around the ITS System 10 to track and store identification information, position and location data, time and other related information about those entities. The information gathered by the gather entity information use case 104 includes, for example, current position of an entity, the length of time an entity is in a particular position, previous visits to a position, identification with respect to the other entities in the system (e.g., such that distinctions among entities may be made or one or more of the entities may be isolated or labeled), co-location data relating to which entities are determined to be in which locations at what times and for what duration, which entities are in proximity to other entities, the type of interaction those entities have with each other (e.g., whether there was physical contact between two entities), and the position or location of such interaction. Such data gathered via the gather entity information use case 104 may be stored in hard copy form or in a historical database 400 in an organized manner for future retrieval and use by the ITS system 10. Databases are generally known in the art, and a detailed discussion thereof is omitted here for convenience only and should not be considered limiting. The database 400 may generally be any such data storage device generally configured for the organized storage and retrieval of data.

Although some embodiments of the present disclosure are directed to the automatic or electronic gathering of information by the gather entity information use case 104, it is to be understood that the relation relevancy system 5 may include various items of other information in electronic or hard copy or paper form or combinations thereof that currently exist in a hospital setting or may be developed in the future. For example, the relation relevancy system 5 can be implemented by gathering information such as date and time of admittance from an admittance form, date and time of an x-ray or the like, room and roommates assigned, doctors and nurses treating the patient during the stay in the hospital and other similar information. Such information can be input into a computer system for automatic analysis or gathered and interpreted manually if desired without departing from the teachings of the present disclosure.

The types of entities interacting with and monitored by the ITS system 10 include persons (individuals) 201, 202, groups of people 203, objects 301, 302 (e.g., equipment, machinery, chemical compounds), groups of objects 303, locations (e.g., a room, a cell, a building, etc.) 401, 402 and groups of locations 403. Similarly, the entities may be digital entities (not shown), such as files or bytes of information that are stored on a computer, server or database. The information gathered relating to these digital entities via the gather entity information use case 104 may include, for example, the IP addresses of computers or networks on which the digital data are located. Similarly, within the context of a telephone conversation, the entities may include the digital signals that are transferred over analog or digital phone lines from one location to another via connections over a telephone or data network or data packets being transferred from one computer to another computer. Similarly, the entities may be business entities or legal fictions such as corporations.

Position Determination System

The gather entity information use case 104 may interact with a position determination system 204 to substantially automatically determine, monitor and/or track the positions of the various entities 101, 102, 103, 201, 202, 203, 301, 302, 303 and the time at which such positions and movement occur. In one embodiment, the Position determination system 204 determines position using an RFID tag and tag reader system; in another embodiment, the position determination system 204 utilizes a GPS or infrared (IR) system to determine position. The use of both RFID tag and reader systems and GPS or IR systems to track position and movement of objects are generally known in the art and a detailed discussion thereof is omitted here for convenience only and should not be considered limiting. Moreover, the position determination system 204 may employ any generally known or future method or system consistent with the present disclosure to determine position of the entities.

In one embodiment, the position determination system 204 determines positions and movements of entities using an RFID tag and reader system (not shown), and includes RFID tag readers placed at specific, known positions within a building or other location, such that RFID tags placed on the entities being tracked are recognized by the RFID tag readers as the entity moves within predetermined distances of the RFID tag readers. In this manner, the position and corresponding time of entities within the system may be determined and recorded.

For example, in a hospital setting, RFID tag readers can be placed in, on or around entry and exit points, rooms, doorways, closets, corridors, etc. Individuals and objects (e.g., patients, visitors, doctors, nurses, technicians, housekeeping staff, commissary staff, janitors, equipment, etc.) can receive RFID tags. For example, a RFID tag can be placed on a patient's identification band on the patient's wrist; RFID tags can similarly be incorporated with employee or visitor badges. Similarly, hospital equipment such as heart rate monitors, defibrillators, wheelchairs, and other items can each also receive RFID tags.

Those skilled in the art will recognize that RFID tags employed as part of the position determination system 204 are linked in some manner to a database or similar system, and, via an identifier, to its associated entity, such that movement of the RFID tag would correspond to movement of that entity. The RFID tags could also be linked to class information identifying the class of the entity. For example, doctors, nurses, and aides can carry RFID tags with a first class identifier, while patients can carry RFID tags with a second class identifier assisting in understanding the relationships of the entities being tracked.

As entities having RFID tags pass by point(s) having a RFID tag reader, the location of the RFID tag reader and the time at which the RFID tag was detected is recorded (e.g., in the historical data database 400). By placing additional RFID tag readers at additional locations, more detailed data can be generated. For example, by placing RFID tag readers on the various rooms of the hospital, more detailed data could be collected about which entity was present in which room at which time, and for how long. Similarly, the analysis of this data both in real-time and in conjunction with analyzing stored data can help to determine position and time of other entities relative to the entity in question. In one embodiment, the RFID tags are equipped with tag reader capabilities, such that entities carrying such tags can detect other entities carrying RFID tags and/or track the distance between other entities.

Those skilled in the art will recognize that, in an embodiment employing a GPS or IR system, the position or location information of the entities could be determined in a similar manner. Moreover, the position information gathered by the gather entity information use case 104 from the position determination system 204 could be obtained using one or more of a variety of positional sources or methods generally known in the art or a combination thereof.

The position and tracking methods of the present disclosure are not limited to analyzing the positional histories of the loci of entity movement in a predetermined environment, but can include direct real time readings from any of a variety of reading devices including, for example, cameras, kiosks or other similar mechanisms with readers (e.g., RFID, optical, biometric) for badge or tag processing. Such systems typically include passive or active tags or readers, including hardware that is able to receive and transmit signals appropriate for the protocol being used and location tracking software for capturing and preprocessing such data. The relevant tag or identification mechanism can optionally be worn by people or can be attached or integrated with portable equipment or the environment (e.g., being placed on particular locations within the system). Those skilled in the art will recognize that the position determination technology may be incorporated with known networking and data transmission protocols and/or infrastructure (e.g., local area networks (LANs), the Internet, wireless protocols, etc.).

Preference Selection

A set selection preferences use case 117 allows a user or operator 130 of the ITS System 10 to set preferences and criteria relative to the tracked entities and otherwise generally interact with the ITS system 10 to manage its operation. The user 130 may be an individual, group of people (e.g., company representative, administrative staff, security personnel, etc.), company, or another electronic system (e.g., computer or computer network). For example, in a prison setting, operation of the ITS System could be managed by contractor (e.g., for initial system set-up) and/or security (e.g., tasked with monitoring the movement of the tracked entities within prison). For example, security staff would likely monitor the movement of prison guards and inmates. In a hospital setting (e.g., tracking transmission of an infectious disease), the user 130 may be hospital administrative staff, a nursing station, the admissions center or central database, or specialists, such as from the Center for Disease Control (CDC) or other medical emergency personnel who are skilled at tracking and containing disease outbreaks.

The user or operator 130 interfaces with the ITS system 10 via a user interface (not shown) configured to accept user input and provide appropriate feedback and options to the user. Such interfaces are generally known in the art; any type of user interface may be used, including keyboard, mouse, touch-screen, voice recognition or the like or any combination thereof. For example, the interface may present the configurable items on a display or in a drop-down menu for acceptance by the set selection preferences use case 117. During operation of the ITS System 10, the settings of the set selection preferences use case 117 may be altered either permanently (e.g., default) or temporarily (e.g., for runtime operations and display customization).

In one embodiment, the set selection preferences use case 117 receives criteria that define which entities are selected as being of interest to the operator 130 and/or to the setting or situation generally. For example, in a hospital setting it may not be very interesting to monitor locations of animals (and relationships associated therewith), whereas it is more important to track newly admitted patients. Thus, the set selection preferences use case 117 defines and sets criteria and other thresholds with respect to selecting which entities are of interest to the system. Included in the selection preferences are settings that configure the ITS System 10 for operation, including settings such as, for example, what type of entities are to be monitored, what criteria are used to select entities of interest, what type of entities are to be selected as relationships considered to be associated with the selected entity, what kinds of proximity will be tracked and monitored (e.g., selecting entities which maintain a specified distance from one another or selecting which entities maintain a specified distance from a particular location, whether contact proximity will be considered or only physical proximity comprising the distance between two or more entities, whether time proximity will be considered, etc.), how the intimacy score is to be calculated, what sorts of relationships will be considered relevant, and what types of relevancies or situations will trigger an alert (e.g. when proximity rules are violated or thresholds are crossed).

Additionally, the set selection preferences use case 117 receives criteria and instructions employed by the determine relevance of relationship use case 107 and the generate alerts use case 128 (both discussed in greater detail below).

Figure 15:
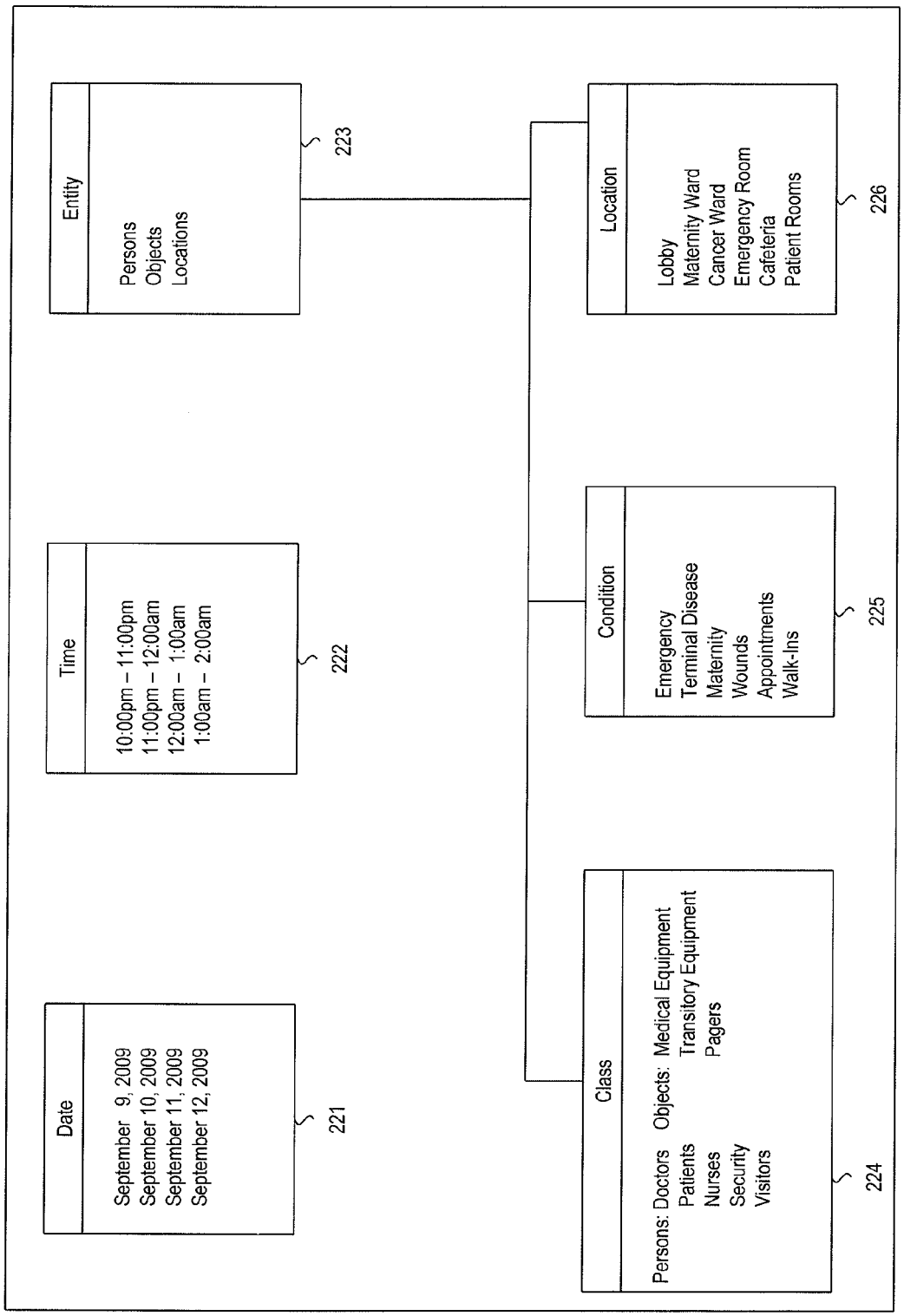
FIG. 15 is a class diagram of the types of parameters that can be set within the system of FIG. 1.

FIG. 15 is a class diagram of the types of criteria that may be set using the set selection preferences use case 117 to determine which entities to select as being of interest for further analysis. The classes shown in FIG. 15 are not exhaustive, but serve as an example of criteria that can be pre-set into the system or selected by the user 130 to defined on what basis to select entities. The set selection preferences use case 117 optionally selects one or more items from the classes and metaclass to enable the select entity of interest use case 105 to select one or more entities to comprise the selected entity set for further analysis.

The date class 221 includes various dates from which the select entity of interest use case 105 will select one or more entities. The time class 222 includes times within a twenty-four hour period. The entity metaclass 223 includes the types of entities in the ITS System 10, such as persons, objects, and locations.

The category class 224 identifies the category of entities for each entity type. For example, in a hospital setting, classes of persons can include doctors, patients, nurses, aides, housekeeping staff, janitorial staff, security staff, management, visitors. These classes can be configured to be as narrow or broad as defined by the user or operator 130 setting the criteria for the set selection preferences use case 117. Categories of objects may include, for example, object classes such as medical equipment (e.g., EKG machines, oxygen tanks) or transitory equipment (e.g., wheelchairs, walkers, stretchers), etc.

The condition class 225 identifies the type of condition, concern or other aspect for which a particular type of entity may be desired to be tracked. For example, in a hospital setting, the condition class 225 includes various types of conditions that a patient might be admitted for or otherwise be identified with. The condition class 225 includes categories such as emergency, terminal disease (e.g., cancer), maternity, wounds (e.g., puncture wounds, gun shots), appointment (e.g., for patients who come in for only a short period of time). Similarly, the condition class 225 could also include the various kinds of diseases (e.g., infectious diseases, airborne diseases, HAIs, bacterial infections, communicable by touch, etc.) so that when entities of interest are selected, when relationships associated with the selected entity are identified, and when proximity is analyzed (e.g., which aspects of proximity are to be analyzed and which aspects are to be considered when calculating intimacy score, etc.), the relevant relationships may be properly determined.

The location class 226 includes various locations in the ITS System 10 that an entity may be present, including, for example, lobby, maternity wing, cancer wing, emergency room, cafeteria, patient rooms, or parking lot.

The present disclosure is not limited to the classes and metaclass listed herein, and may include other types of classes or metaclasses based on the needs of the user 130 configuring the ITS System 10 based on the particular setting, environment or situation.

Additionally, when instructing the select entity of interest use case 105 as to which entities to select, the set selection preferences use case 117 can interact with the retrieve items of information use case 109 to retrieve information to further define how the select entity of interest use case 105 selects entities. For example, the retrieve items of information use case 109 can be configured to retrieve information from a condition database 444 (e.g., a database containing information about diseases and their characteristics) to instruct the select entity of interest use case 105 to select entities based at least in part on epidemiological infection transmission characteristics of diseases which are set to be monitored. As an example, certain diseases may only require a minimal proximity or a physical contact to effect transmission, yet transmission may be independent of the duration of the proximity or contact. Thus, the select entity of interest use case 105 could be configured to consider persons who move within a proximity to a patient having a particular disease independent of the time proximity considerations.

Entity Selection and Relationship Determination

The select entity of interest use case 105 receives information from the gather entity information use case 104, and interacts with the set selection preferences use case 117 to obtain one or more pre-defined criteria (e.g., an entity present at a particular time or date, an entity having a particular condition, an entity belonging to particular class of entities, an entity at a particular location, an entity that has been in a selected set of locations, an entity that has not moved in a given period of time, an entity that has been in proximity with another entity, an entity that recently had physical contact with another entity, etc.) or some combination thereof to determine one or more entities that might be of interest to the ITS system 10 for further analysis.

The select entity of interest use case 105 may select a single entity, a plurality of individual entities, a class (i.e., type) or group of entities, multiple classes of entities, or other set of entities deemed to be of interest for further analysis. For example, in one embodiment the ITS System 10 tracks individual persons moving throughout a location or set of locations. In this embodiment the select entity of interest use case 105 may select, based on preset criteria from the set selection preferences use case 117, an individual person or a group of persons that entered a hospital through a certain entrance for further relationship analysis. Similarly, classes or groups of people can also be selected according to a shared trait or feature attributed to each of those persons. For example, the class of maternity ward patients in a hospital, and the class of medical staff who attend to the maternity ward patients can be selected to comprise the selected entity set.

An identify relationships use case 113 identifies entities that have come into proximity with the entity, entities, or group(s) of entities within the selected entity set and places those entities in an identified-as-related entity set. For example, the entities in the identified-as-related entity set may be other people or objects that have been within a pre-defined radius of the entities in the selected entity set, that have been within the same room as the one or more entities in the selected entity set or that have come into physical contact with the selected entity set, or that have been in one or more locations (e.g., rooms or areas of a building) that the selected entity set has been located within, etc. The entities of the identified-as-related entity set are associated with the entities of the selected entity set and have a relationship with them by virtue of their identified association. Thus, the fact that there is a relationship between two or more entities or groups thereof presupposes that a proximity exists, or at one time existed, between the entities of the selected entity set and those of the identified-as-related entity set. As discussed in greater detail below, the identified relationships (and their associated entities) may be displayed or otherwise visually represented to via the relational visualization system 205.

When the identify relationships use case 113 identifies relationships associated with a selected entity, not every entity being monitored by the ITS System 10 will be included as being part of a relationship. That is, an entity in the ITS system 10 will not necessarily have a relationship with one or more other entities in the system. Furthermore, there may be entities in the ITS System 10 that do not have a relationship with the entities in the selected set. This is because that only entities that have had an interaction with one another or entities which have come in proximity with one another on one or more occasions are said to have a relationship.

Figure 16:
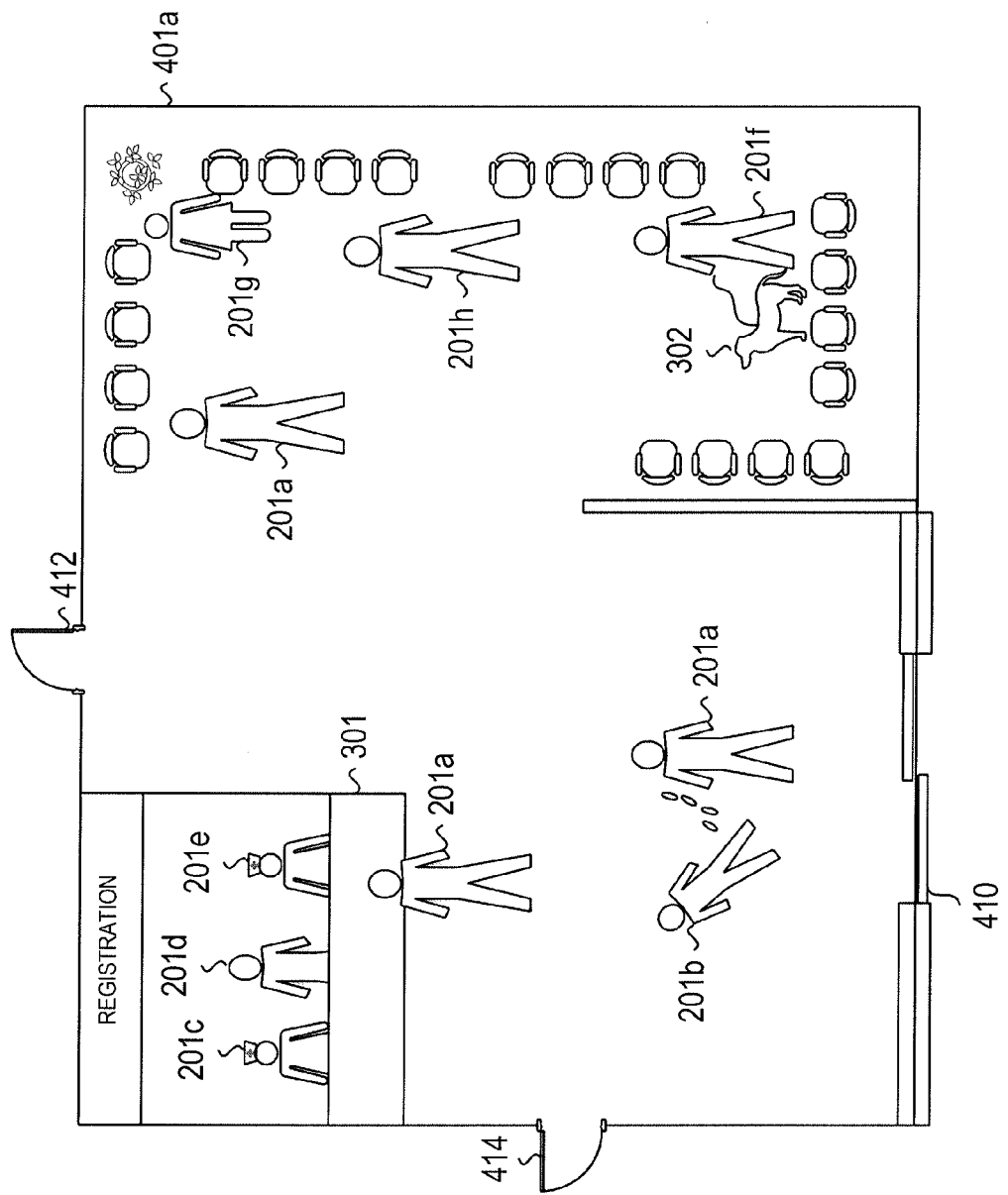
FIG. 16 is a system diagram illustrating an example of identifying related entities.

Referring to FIG. 16, an example of identifying related entities depicts a waiting room 401*a* (e.g., the waiting and/or entry area for a particular area, department, or wing, such as the emergency, oncology or cardiology) which a part of a hospital (not shown) being monitored by or that otherwise utilizes the ITS System 10. For purposes of this example, employees, patients and visitors check in and receive a badge as they enter the hospital that enables their position(s) within the hospital to be tracked. In the example of FIG. 16, entities enter and exit the waiting area 401*a* via an exterior entrance 410 or through one or more interior doorways or hallways 412, 414 that lead to other areas of the hospital. Sick person 201*a* has symptoms of an infectious airborne virus, including a bloody nose and a body drenched from sweat. He receives his badge (not shown) upon entering the building, and enters the waiting room 401*a* via the main exterior entrance 410. In the waiting room 401*a*, there are office staff 201*c*, 201*d*, 201*e* (e.g., nurses, orderlies, administrative staff) sitting behind a registration counter 301, an otherwise healthy patient 201*b* leaving the waiting room via the exterior entrance 410, and other patients 201*g*, 201 *h*, waiting to be seen by a doctor, including a blind person 201*f* and her seeing eye dog 302. After entering the waiting room 401*a*, sick person 201*a* rushes to the registration counter 301 and on his way, collides with otherwise healthy patient 201*b* knocking him to the floor. After checking in, sick person 201*a* takes a seat next to the other patients 201*f*, 201*g*, 201*h*.

In this example, the set selection preferences use case 117 (e.g., based on preferences and other input from the user 130) has identified criteria for selecting entities of interest to include the day that the sick person 201*a* is in the hospital, as well as specifying that the entities of interest be patients. In addition, the set selection preferences use case 117 specifies that unscheduled hospital visits be tracked.

In the example of FIG. 16, based on the criteria of the set selection preferences use case 117, the only person in the hospital (in this example) who would be selected by the select entity of interest use case 105 to be part of the selected entity set would be the sick person 201*a*; the other people in the waiting room 401*a* would not be selected as an entity of interest because they did not meet the criteria set by the user in the set selection preferences use case 117 (i.e., they were not in building for unscheduled visits). Those skilled in the art will recognize that, in other examples, additional entities would likely satisfy the criteria established by the set selection preferences use case 117.

Continuing with the example of FIG. 16, the identify relationship use case 113 identifies other persons in the hospital with whom sick person 201*a* has been in proximity with or who he has come in contact with as having a relationship with sick person 201*a* (i.e., the identified-as-related entity set). Such persons would include patient 201*b* who came into physical contact with sick person 201*a* when being knocked to the ground, the staff 201*c*, 201*d*, 201*e* at the registration counter 301, and the other patients 201*f*, 201*g*, 201*h* in the waiting room 401*a*. The seeing-eye dog 302 would be excluded from the identified-as-related entity set because, even though the dog 302 was in the same room as the sick person 201, the criteria set in the set selection preferences use case 117 only selected persons, not objects.

Based on the relationships identified in the identify relationships use case 113, the proximity between the sick person 201*a* and the other persons in the hospital are analyzed by the proximity analysis system 207 (discussed below). The retrieve items of information use case 109 (also discussed below) would retrieve items of information relating to excited person 201*a* and his relevant conditions), and the determine relevance of relationship use case 107 (also discussed below) would determine that the other persons in the waiting room were likely exposed to the virus of sick person 201*a*. Thus, the ITS System 10 could initiate an alert via the generate alerts use case 128 instructing that the other persons who were in the waiting room 401*a* be located and quarantined. Optionally, the ITS System 10 could add the persons in the waiting room 401*a* who were formerly in the identified-as-related entity set to form a secondary selected entity set and cycle through the ITS System 10 to determine who is in the identified-as-related entity set for those persons likely exposed to the virus that sick person 201*a* brought into the doctor's office, etc.

Relationship Types

Generally, the identify relationships use case 113 in FIG. 1 may identify a number of different types of relationships to be part of the identified-as-related entity set. Such relationships can include person-person relationships, person-object relationships, object-object relationships, person-location relationships, and other types of relationships each of which will now be described in more detail and apply to a variety of settings other than the specific examples listed.

Person-person relationships include relationships where there is a proximity between two or more individuals. These relationships (when described with respect to a medical setting) include, for example, doctor-patient relationships, patient-patient relationships, patient-visitor relationships, and person-to-person relations among medical staff. Similarly, with respect to a prison setting, person-person relationships include relationships between a prison guard or a warden or prison staff (hereinafter, "prison security personnel") and a prisoner, one or more of a group of prison guards and one or more of a group of prisoners, relationships between prisoners, and relationships between one or more of a group of prisoners and one or more of a group of visitors. Similarly, in a retail shopping setting where the habits of shoppers are tracked (e.g., via a tracking device being placed in or on a shopping cart), person-person relationships may include interactions between one or more shoppers (e.g., does a shopper buy more when more than one shopper shops together?), shoppers and sales staff, etc. In a government agency setting, person-person relationships might include tracking interactions between employees, between employees and non-employees within the agency building, and between employees and people in the outside world (e.g., phone conversations or e-mail transactions between employees and non-employees).

Person-object relationships include relationships where there is a proximity between a person and an object. This can include being in a common location with the object or being in physical contact with that object. The object can be any object, and is not limited by the examples below. Examples of person-object relationships in a medical setting include a contact between a doctor, nurse, hospital staff (hereinafter, "medical staff") or patient, and, for example, hospital equipment (e.g., stretchers, syringes, heart monitors, etc.), cell phones, doors, toilets, etc. that have come into proximity or contact with the persons. Other examples include an interaction between a person and an isolate (a microbial or viral sample). With respect to a prison setting, person-object relationships include, for example, contact between prison security personnel and prison security equipment (including contact with locks, gates, entrance and exit doorways, prison cells, prison computers, or network equipment), as well as contact between prisoners and prison security equipment (including computer equipment, internet access, and network servers or web sites accessed with the computer equipment). Other examples of relationships between persons and objects include detecting and/or determining a relationship that could determine the source of a theft that has taken place with a particular piece of equipment. For example, a person-object relationship could include a RFID tag or other means of tracking an interaction between a person and a piece of equipment wherein that interaction between the person and the equipment is tracked or logged. When a piece of equipment is missing, monitoring the interactions can determine who has had access to or who has been in the vicinity of that equipment that is now missing.

Object-object relationships include interactions between objects that are moved to be in proximity with one another or which are used in conjunction with one another. For example, an object-object relationship can comprise medical equipment (e.g., EKG machine) being used in conjunction with other devices (e.g., a monitor and a printer) which are attached to the medical equipment. Similarly, it could comprise a RFID tag which interacts with a RFID tag reader when the two are brought into proximity. Object-object relationships also include isolates and objects such as laboratory equipment that have come into contact with the isolates.

Person-location relationships include interactions between persons or groups of persons and a location or a group of locations. For example, referring to FIG. 1, a person-location relationship can comprise a first person 201 and a first location 401, wherein the first person 201 could be one of a group of persons 203, and the first location 401 could be one of a group of locations 403 or a subset of a larger structure (e.g., a room within a wing of a hospital, or a room within a building).

Similarly, object-location relationships include interactions between one or more objects and a location or a group of locations. This type of relationship can comprise, for example, a first object 301 and a first location 401, wherein the first object 301 could be one of a group of objects 303, and the first location 401 could be one of a group of locations 403 or a subset of a larger structure (e.g., a room within a wing of a hospital, or a room within a building). For example, the object may be a piece of equipment or a RFID tag or other tracking mechanism attached to an object which is detected to be in or to pass through a particular location such as an entry or exit point, a security gate or checkpoint, a particular wing of a hospital, a prison cell or section or block of a prison, or more generally, a room within a building or structure.

Proximity Analysis

Figure 2:
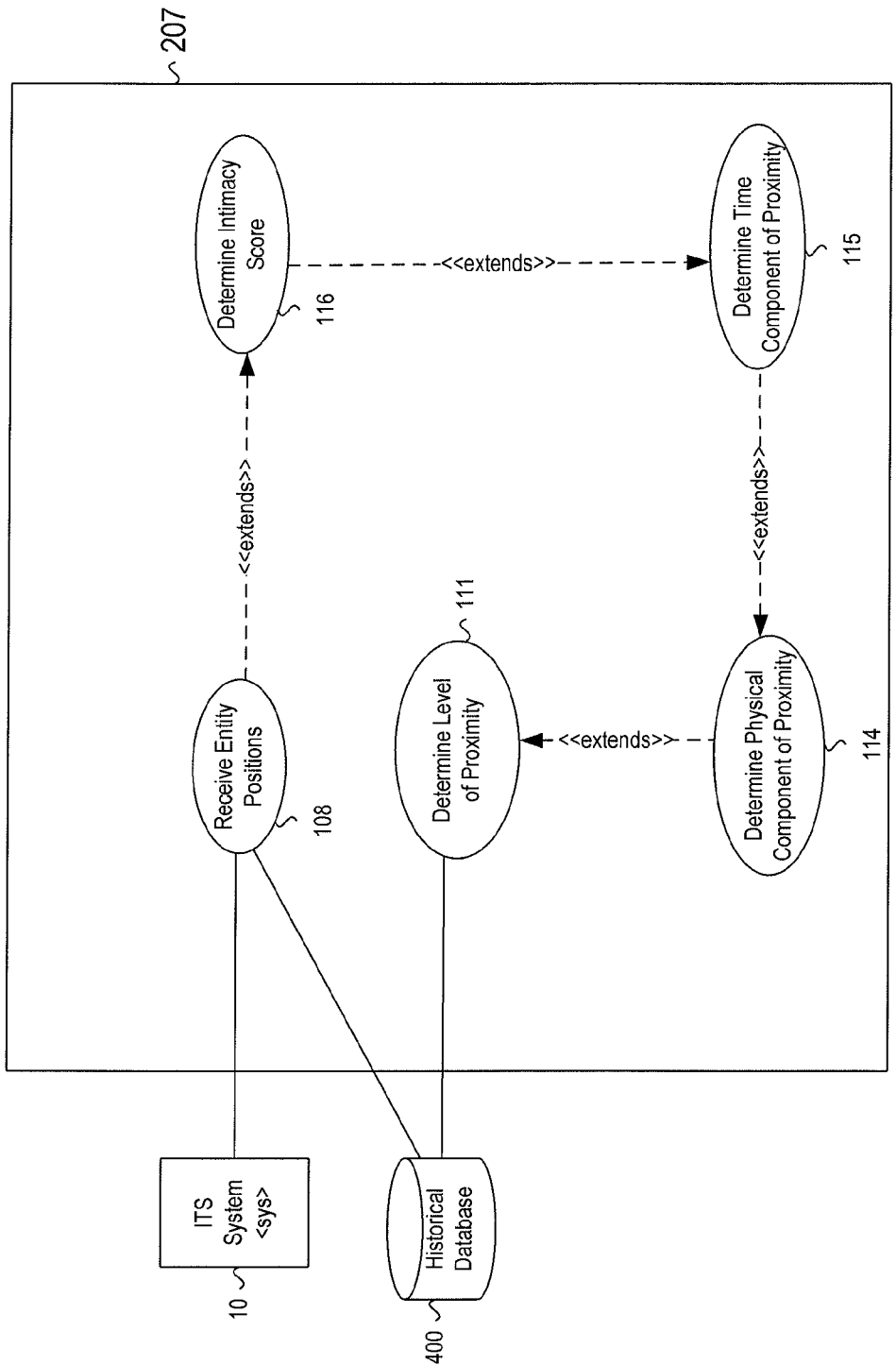
FIG. 2 is a use case diagram of the proximity analysis system in accordance with the embodiment of FIG. 1.

A proximity analysis system 207 analyzes the positional information and determines the proximity, the level of proximity, and the intimacy scores of the relationships between one or more entities in the selected entity set and their respective identified-as-relevant one or more entities of the identified-as-related set. FIG. 2 is a use-case diagram of the proximity analysis system 207, including a receive entity positions use case 108 that interacts with the ITS System 10 and the historical database 400 to retrieve the present and previous position data (as previously discussed) and corresponding times of the entities contained in both the selected entity and the identified-as-related entity sets. A determine level of proximity use case 111 analyzes the various kinds of proximity that can take place between the selected entity set and the identified-as-related entity set.

In discussing the level of proximity between the entities in the determine level of proximity use case 111, two components generally describe the level of the proximity in terms of physical separation and time. A determine physical component of proximity use case 114 analyzes the physical separation between the entities and the various kinds of proximity that relate to physical separation between entities. The second component of proximity (i.e., duration or time) is described in greater detail below within the context of the determine time component of proximity use case 115. Additionally, the determination of the level of proximity between the entities is impacted by the number of times in which proximity (i.e., instances of physical proximity) occurs between entities of the selected entity set and entities of the identified-as-related entity set. Repeated instances of proximity tend to increase the level of proximity between the entities, as described in discussing the intimacy score below.

Figure 3:
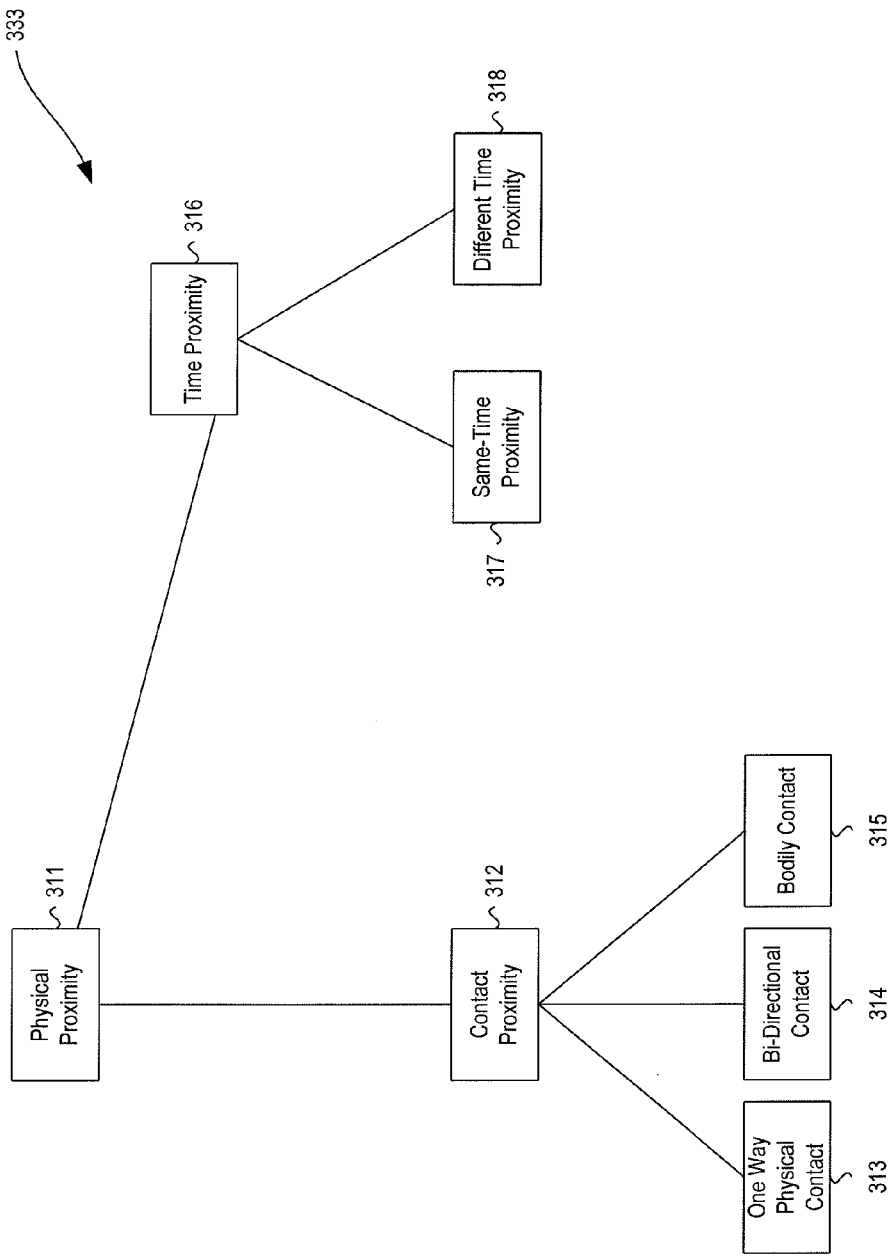
FIG. 3 is a block diagram showing examples of proximities associated with the present disclosure.

FIG. 3 is a proximity-type tree diagram 333 that depicts an example of the various kinds and levels of proximity that can occur between the selected entity and the entities with which the selected entity has a relationship (i.e., the identified-as-related entity set), as determined by the determine level of proximity use case 111 in FIG. 2.

One type of proximity determined by the determine physical component of proximity use case 114 is represented by a physical proximity class 311 in the proximity-type tree diagram 333. Generally, physical proximity occurs when one entity is within some relevant, definable physical distance of another entity, where the entities are not necessarily in physical contact with each other. Thus, the physical proximity class 311 generally involves measuring, detecting, or otherwise determining components of physical separation between entities or groups of entities. Physical proximity in the physical proximity class 311 may occur, for example, when one of the entities of the selected entity set and another of the entities of the identified-as-related entity set are in the same room or enclosed structure at some distance apart, or when they are in different rooms or areas but have some relevant physical link to each other (i.e., one of the entities passes by the other or passes by a room in which the other of the entities is located).

Figure 4:
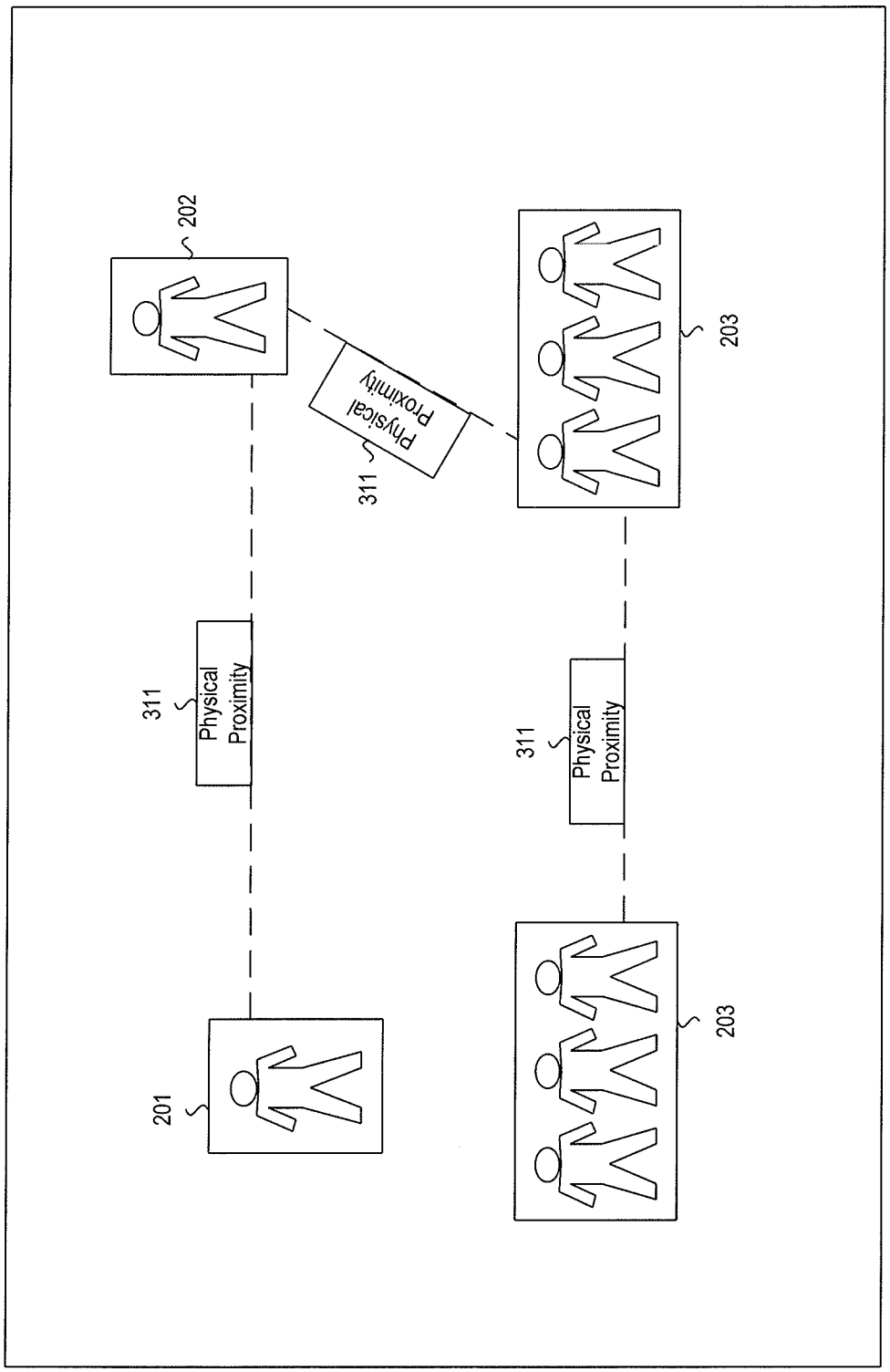
FIG. 4 is a block diagram showing an exemplary set of person-person interactions between entities in accordance with the present disclosure.

FIG. 4 is a person-to-person physical proximity diagram which shows an example of the physical proximity class 311. The physical proximity may be a co-location between a first person 201 and a second person 202, or between one or more of a group of people 203 and a second person 202 or one or more of a group of second persons 203.

Figure 5:
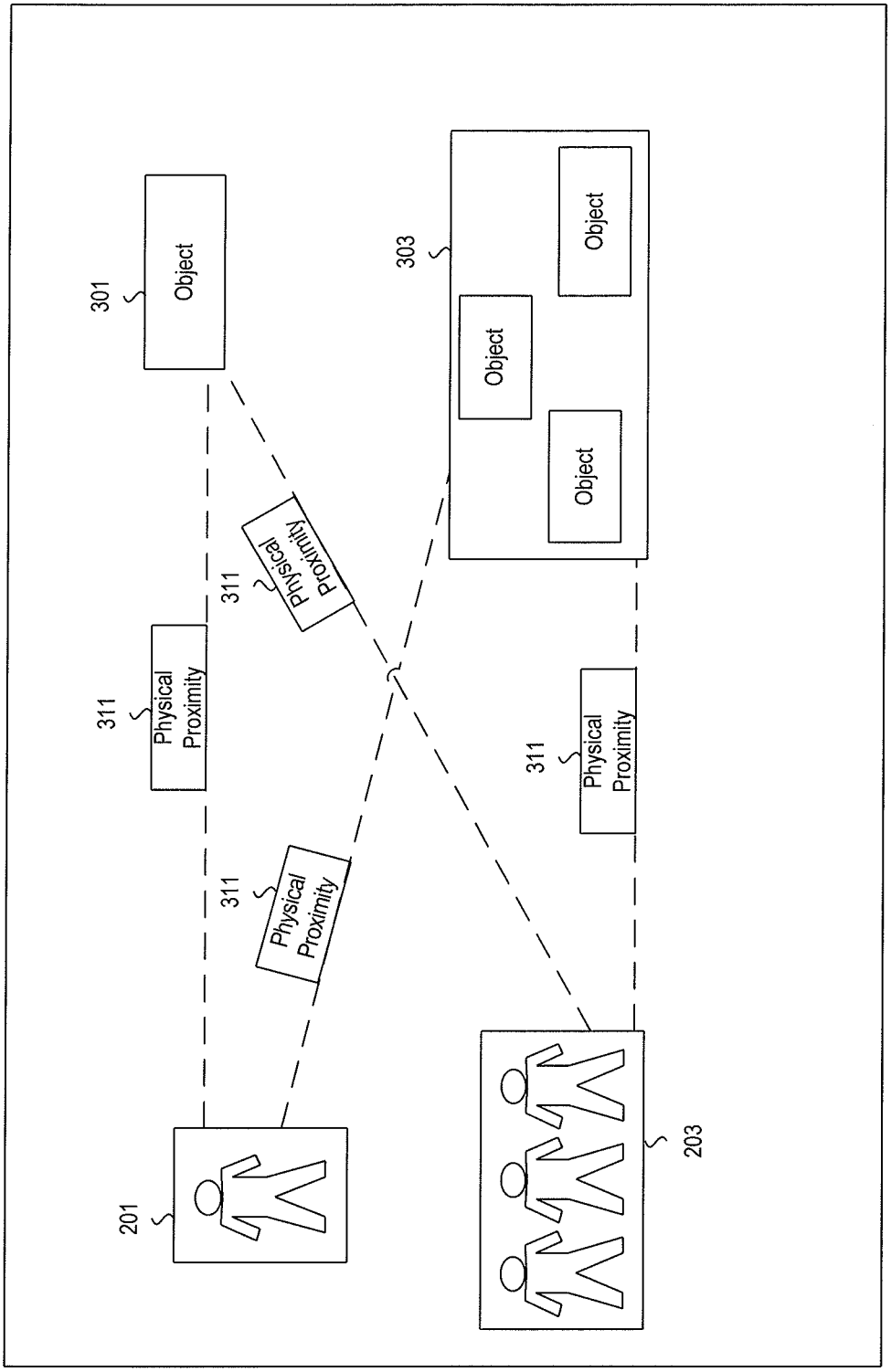
FIG. 5 is a block diagram showing an exemplary set of person-object interactions between entities in accordance with the present disclosure.

FIG. 5 is a person-to-object physical proximity diagram which shows another example of the physical proximity class 311. In the example of FIG. 5, the physical proximity can be the co-location between a person 201 or one or more of a group of persons 203 and an object 301 or one or more of a plurality or group of objects 303. Similarly, although not shown in FIGS. 4 and 5, the physical proximity may comprise contact proximity, as represented by the contact proximity class 312. The contact proximity could include the physical touching between a first entity 201, 301 or one or more of a plurality or group of entities 203, 303 and a second entity 202, 302 or one or more of a plurality or group of entities 203, 303, etc.

Figure 6:
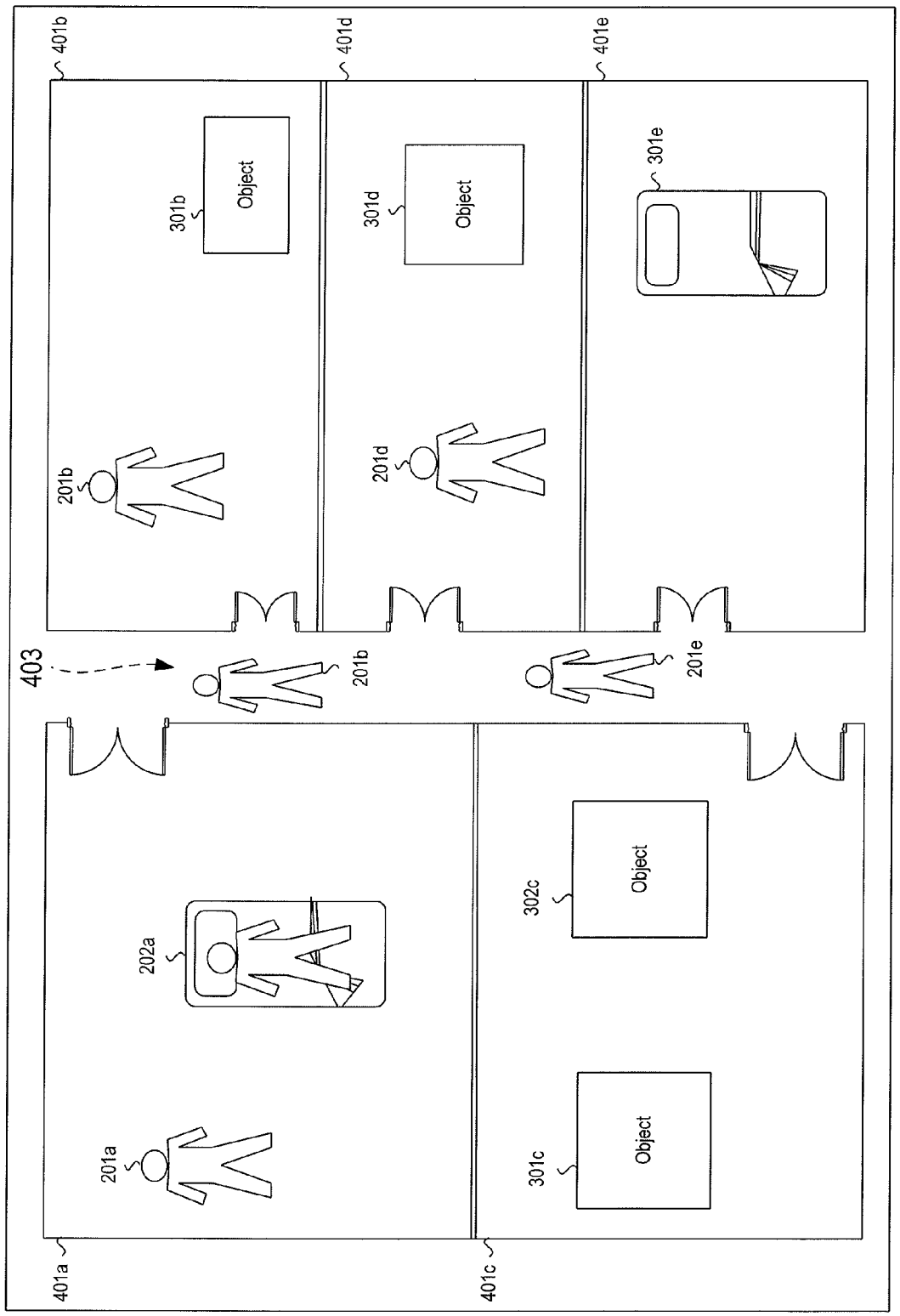
FIG. 6 is a block diagram showing another exemplary set of interactions between entities in accordance with the present disclosure.

FIG. 6 shows an example of the physical proximity where the entities in physical proximity comprise people. Using the example of a medical setting, in FIG. 6 a doctor 201*a* and a patient 202*a* are in the same room 401*a*. One of the medical personnel 201*b* is located in a hallway 403. The physical proximity that occurs is at least threefold. One instance of physical proximity occurs between the doctor 201*a* and the patient 202*a* in that they are in the same room 401*a* and are positioned some distance apart within that room. Another instance of physical proximity occurs between the medical personnel member 201*b* and the patient 202*a* in the room 401*a* (e.g., as the medical personnel passes by the room 401*a*). Another instance of physical proximity occurs between the doctor 201*a* and the medical personnel member 201*b*.

Another example of physical proximity may occur in a prison setting, in the form of physical separation between prison security personnel and the prisoners that they are responsible for guarding. Thus, physical proximity can be used to measure and track the interactions between a prison guard and a prisoner to determine whether a prison guard is approaching a prisoner in an inappropriate or unscheduled way. In addition, the proximity between one prisoner 201 and another prisoner 202, or one group of prisoners 203 and another prisoner 202 can be tracked or monitored to detect fraternal relationships between individual prisoners and groups of prisoners. This interaction can detect activities such as patterned behavior where the physical proximity occurs between a multitude of individual prisoners 203 and another prisoner 202, for example, one or more prisoners interacting with a crime boss, a leader of a gang, or a drug dealer. Similarly, the physical proximity could occur between groups of prisoners which are useful in detecting gang activity and fraternal affiliations. The physical proximity may also include interactions between prison guards and prisoners to detect any disease outbreaks as well as illegal activities on the part of one or more of the prison guards, such as the physical abuse of a prisoner or a group of prisoners by a prison guard or by a group of prison guards, or such as the supplying of illegal paraphernalia such as drugs or weapons from a guard to a prisoner, or from a prisoner to another prisoner.

Physical proximity can also comprise person-object interactions, where, for example, a person and an object are positioned within the same room or location. Referring again to FIG. 6, a patient 201*b* in a room of a hospital 401*b* is in physical proximity to an object 301*b* where a distance between the patient 201*b* and the object 301*b* is detected (e.g., when the detected distance between the patient 201*b* and the object 301*b* crosses a certain threshold, it would be detected that the person was entering or exiting the room). In another example, such position detection identifies that the object 301*b* has entered the room 401*b*.

Similarly, the physical proximity of the physical proximity class 311 can also reflect interactions in a prison setting, where the physical proximity includes interactions between a prisoner and an item on his or her person or within his or her cell, or between one or more of a group of prisoners and items on their persons or within each of their respective cells.

Still referring to FIG. 6, physical proximity also includes interactions or a proximity between objects, namely a first object 301*c* and a second object 302*c*. For example, in a hospital setting, objects being tracked can include a piece of equipment 301*c* and an object 302*c* in a room 401*c* to which that object is assigned. For example, physical proximity can be detected by the placing of a heart monitor 301*c* near a patient's bed 302*c*.

Physical proximity also includes interactions between one person and a group of persons and one location or a group of locations, where the one or more persons are positioned in a location or in a group of locations. Referring to FIG. 6, physical proximity can occur between a doctor 201*d* and a particular location 401*d*, where the doctor 201*d* is positioned in or around that location 401*d*. Such physical proximity between a doctor's position 201*d* and a particular location 401*d* may indicate the presence of a doctor 201*d* being in an area or room 401*d* of the hospital that they do not have authorization to be present in. This would be relevant if the doctor 401*d* is found to frequent a room 401*d* containing drugs or hazardous materials 301*d* deemed to be improper for someone of their authorization level. Similarly, the absence of a particular individual 201e (reflected in the figure as an empty bed 301e) from a room 401e to which that individual is assigned can indicate that the individual 201e has strayed into an area he does not have permission to be located, or that, in the case where the patient is a child 201e who has been brought into the hospital for suspicion of child abuse, the absence of that child 201e from his assigned room 401e might indicate that a kidnapping has taken place.

Similarly, in a prison setting, physical proximity can be the presence of a prisoner or one or more of the group of prisoners in an area of the prison or jail they do not have authorization to be present in, such as a room containing weapons. The physical proximity can also measure the physical separation of a prisoner from his designated prison cell. Similarly, it could measure the physical separation of a group of prisoners from an area within the prison in which they are scheduled to be located. Further, the physical proximity can measure the physical separation of a prison guard from his designated post or area or wing of the prison the prison guard is responsible to guard to identify a potential security risk where the prison guard is not at his post.

Additionally, physical proximity can occur between an object 301 or one of a plurality of objects 303 and a location 401 or one or more of a plurality of locations 403 to detect a deviation from the location in which the object is supposed to be located. This can help to detect a theft or an unauthorized usage of that object. For example, as shown in FIG. 6, physical proximity may reflect the distance from a particular patient's room 401b that a particular piece of equipment 301b is designated to be located within. Similarly, physical proximity may reflect the distance between a machine that supplies oxygen and a smoking room or a smoking area, where if the oxygen machine moved close enough to the smoking area, a spark could ignite the oxygen within the oxygen machine. Similarly, in the setting of a prison, the physical proximity can be relevant when tracking the movement of a firearm or firearms towards a location inside the prison or within a block 403 of the prison designated as being weapon-free.

A subset of the physical proximity class 311 in FIG. 3 includes a contact proximity class 312. Here, the physical proximity can be evaluated in terms of whether there has been a physical touching or physical contact between a first entity 101 and a second entity 102. The contact proximity class 312 has multiple subsets including a one-way physical contact class 313 and a bi-directional contact class 314. The one-way physical contact class represents one-way physical contact between a first entity 101 which initiates and/or applies a force to a receiving, substantially passive second entity 102, or vice versa. The bi-directional contact class 314 represents a two-way physical contact where the entities are touching one another with both taking an active part in the contact.

In addition to the one-way physical contact sub-class 313 and the bi-directional contact sub-class 314, the contact proximity class 312 also includes a bodily contact class 315 that represents a bodily contact proximity where bodily fluids (such as, for example, saliva, mucus, or blood) of a first person 201 come into contact with a surface (such as skin surface, clothes, or objects attached) of a second person 202.

Referring again to FIG. 4 (although contact between the entities is not specifically depicted therein), contact proximity may include one-way physical contact (as reflected by the one-way physical contact class 313) from a first person 201 or from one or more of a first group of persons 203 to a second person 202 or to one or more of a group of persons 203 and vice versa. Similarly, the contact proximity may include bi-directional contact proximity (as reflected by the bi-directional contact class 314). Such contact proximity occurs when one person 201 or one or more of the persons 203 touches the other person 202 or one or more of the other persons 203. The touching can be a person-to-person touching where contact is made between the skin, the clothes, or the objects attached to the persons in contact.

Figure 7:
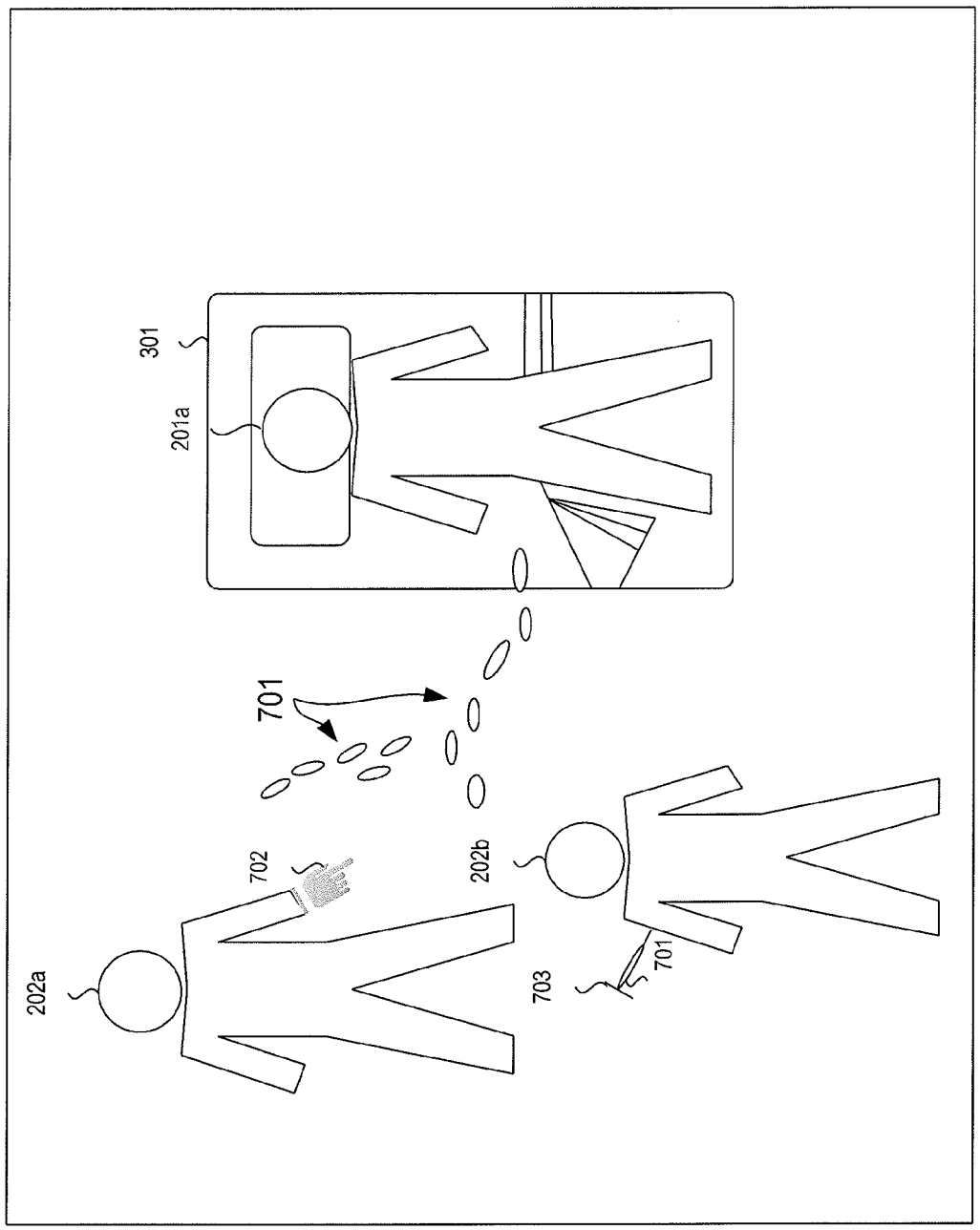
FIG. 7 is a block diagram showing exemplary bodily interaction between entities according to one embodiment of the preset disclosure.

FIG. 7 depicts an example of the bodily contact class 315 in a hospital setting. In the example of FIG. 7, bodily fluids 701 of a patient 201a come into contact with the outer garments (e.g., clothes, gloves, etc.) of a doctor 202a treating that patient. However, the bodily contact proximity could comprise the transfer of bodily fluids from one person 201a to another, such as is seen here where the doctor 202b is punctured by a syringe 703 that has come into contact with the fluids 701 of patient 201a.

In other embodiments, such bodily contact proximity could also occur, for example, when individuals share a syringe. Bodily contact proximity can occur with regard to the transfer of fluids from one person to another person, such as the kind of person-to-person fluid exchange that can occur in a restaurant where a person performs cardiopulmonary respiration (CPR) on another person. Similarly, bodily contact proximity may occur in a prison setting where one or more individuals are in physical contact, be it via a prison brawl or fright, or via sexual contact between prisoners.

Referring again to FIGS. 2-3, another type of proximity that is accounted for in the determine level of proximity use case 111 is represented by the determine time component of proximity use case 115 which reflects the time or duration component of the physical proximity between the entities. As shown in the right-hand side of the proximity-type tree diagram 333 of FIG. 3, the time proximity class 316 reflects interactions that take place between entities in time. Subclasses of the time proximity class 316 include same-time proximity class 317 and different time proximity class 318. The same-time proximity class 317 represents forms of proximity that occur when the entities involved in the proximity are present in the same place at the same time, while the different-time proximity class 318 represents forms of proximity that occur when the entities involved in the proximity are present in a location at different times. The various forms of time proximity reflected by the time proximity class 316 of the proximity-type tree diagram 333 include duration measurements that measures how long entities are in physical proximity with one another, along with a number of various kinds of time proximity measurements that be obtained regardless of whether the entities are subject to same-time proximity 317 or different-time proximity 318.

Figure 8:
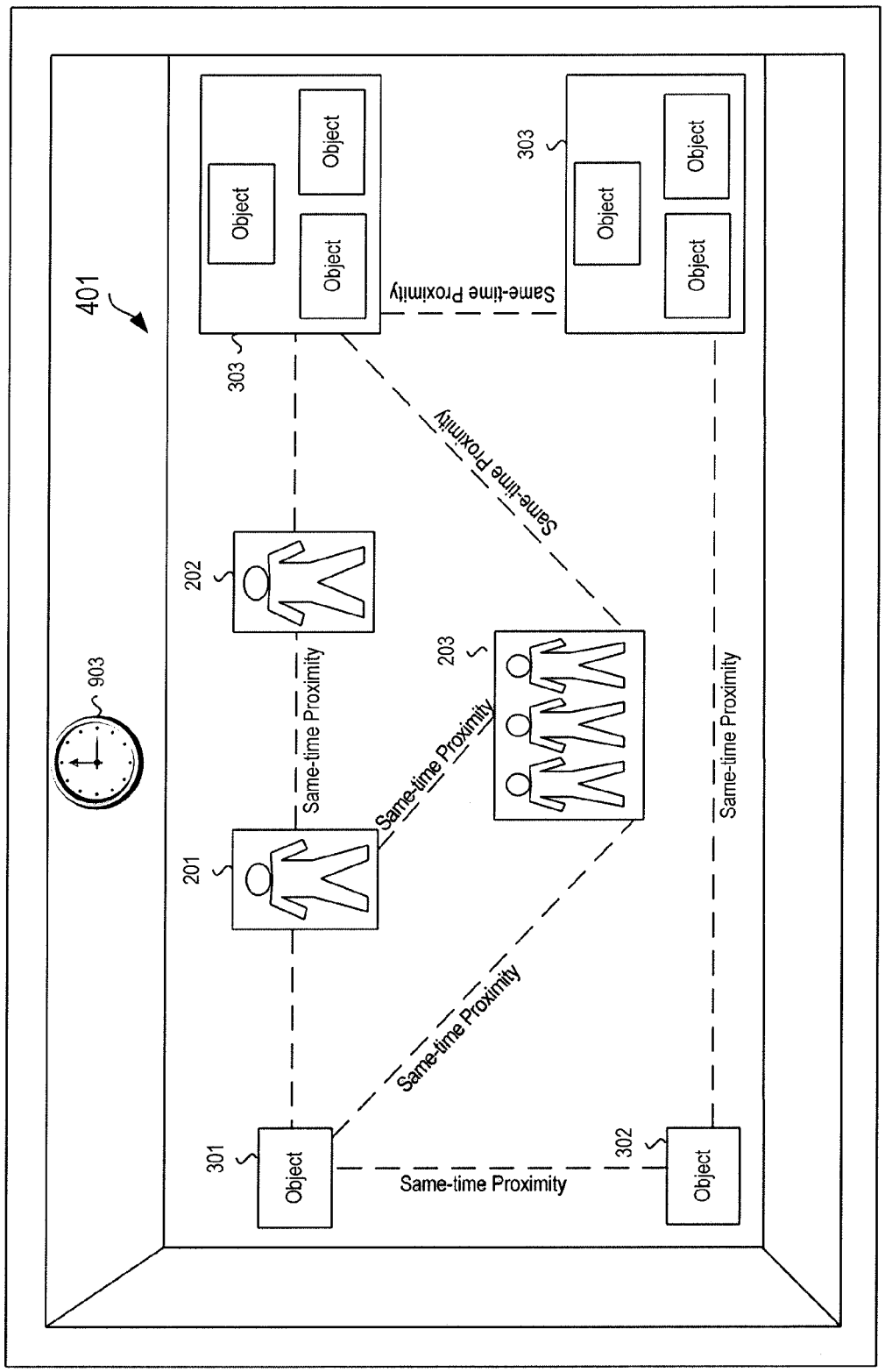
FIG. 8 is a diagram showing an example of same-time proximity between entities in accordance with one embodiment of the present disclosure.

FIG. 8 is a same-time proximity diagram that shows an example of the relationship between entities (in this example, people, objects, and locations), where their physical proximity or co-location occurs over a common duration of time. While the physical proximity class 311 reflects the physical separation in space between the entities, same-time proximity 317 accounts for periods during which the entities were in the location at which the interaction occurred at common durations of time. Thus, in the interactions between the people, the objects and the locations in the example of FIG. 8, such interactions occur at one instance of time depicted by one clock 903; this differs from other examples where multiple clocks reflect interactions where the entities are not necessarily in the same location at the same time.

Thus, in the example of same-time proximity in FIG. 8, a first person 201 and a second person 202, or a first person 201 and or one or more of a group of persons 203 are present in a particular location at the same time. Similarly, an example of same-time proximity occurs where a first person 201 and an object 301, or one or more of a group of persons 203 and an object 301 or one or more of a plurality of objects 303 are present in a particular location 401 at the same time. Same-time proximity can also occur where a first object 301 or one or more of a plurality of first objects 303 and a second object 302 are present in the location 401 at the same time. Accordingly, one measurement that may be taken in a same-time proximity relationship or interaction is the duration in which the entities are in physical proximity to each other.

The different-time proximity class 318 describes interactions between entities where the entities are present in a common location, but at different times. Here, the entities are not necessarily present in a particular location at the same time.

There are a number of ways of measuring different-time proximity. In one instance, different-time proximity measures elapsed-time proximity, where two or more entities are in contact with a particular location, but time has passed between a first time that a first entity has left a particular position within a location and a second time that a second entity has entered the location where the prior entity was located.

Figure 9:
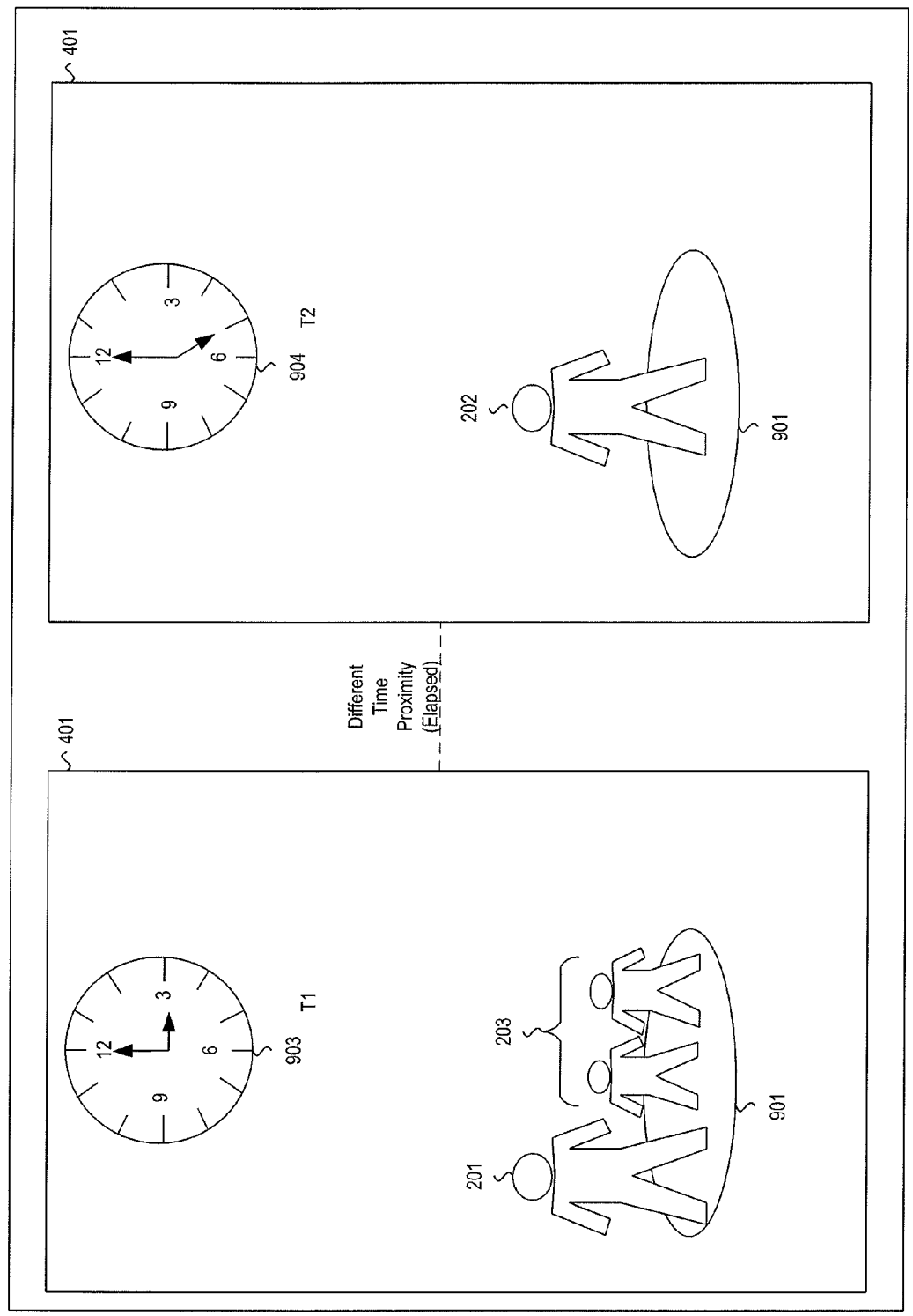
FIG. 9 is a diagram showing an example of elapsed-time proximity between entities and their locations in accordance with one embodiment of the present disclosure.

FIG. 9 shows an example of a relationship between entities (in this example, people) in a common position 901 within a room 401, but at different times. On the left side of FIG. 9 a first person 201 (or a group of persons 203) in position 901 in the room 401 at a first time T1 903 (in this example, 3 p.m.). On the right-hand side of FIG. 9 is a second person 202 in the same position 901 of the room 401 at a second time T2 904 (i.e., 5 p.m.). The rooms 401 and positions 901 used by both entities 201, 202 are the same, except that two hours have passed between T1 and T2 (i.e., the time since the first person 201 (or the first group 203) left the room 401 and the second person 202 entered the room two hours later). While noting that the positions 901 of the entities within the room 401 at times T1 and T2 are the same position, those skilled in the art will recognize that there is no requirement for elapsed-time proximity that the entities necessarily have to be in the same exact position 901 at their respective times. Additionally, while the entities in the example of FIG. 9 are persons 201, 202, 203, it should be understood that elapsed-time proximity is applicable regardless of whether the entities include people, objects, or a combination thereof.

Another way of measuring the different-time proximity class 318 reflects how long each of two or more entities have been in a particular location. This can be referred to as time presence proximity, and is similar to the conditions represented by elapsed-time proximity in that some time passed between the time a first entity exited a particular location and a second time a second entity entered that same location. Time-presence proximity can also represent a measurement of the same-time proximity class 317 in that the measurement determines how long each set of entities are in a particular location when those entities are co-located for at least a period of time.

Figure 10:
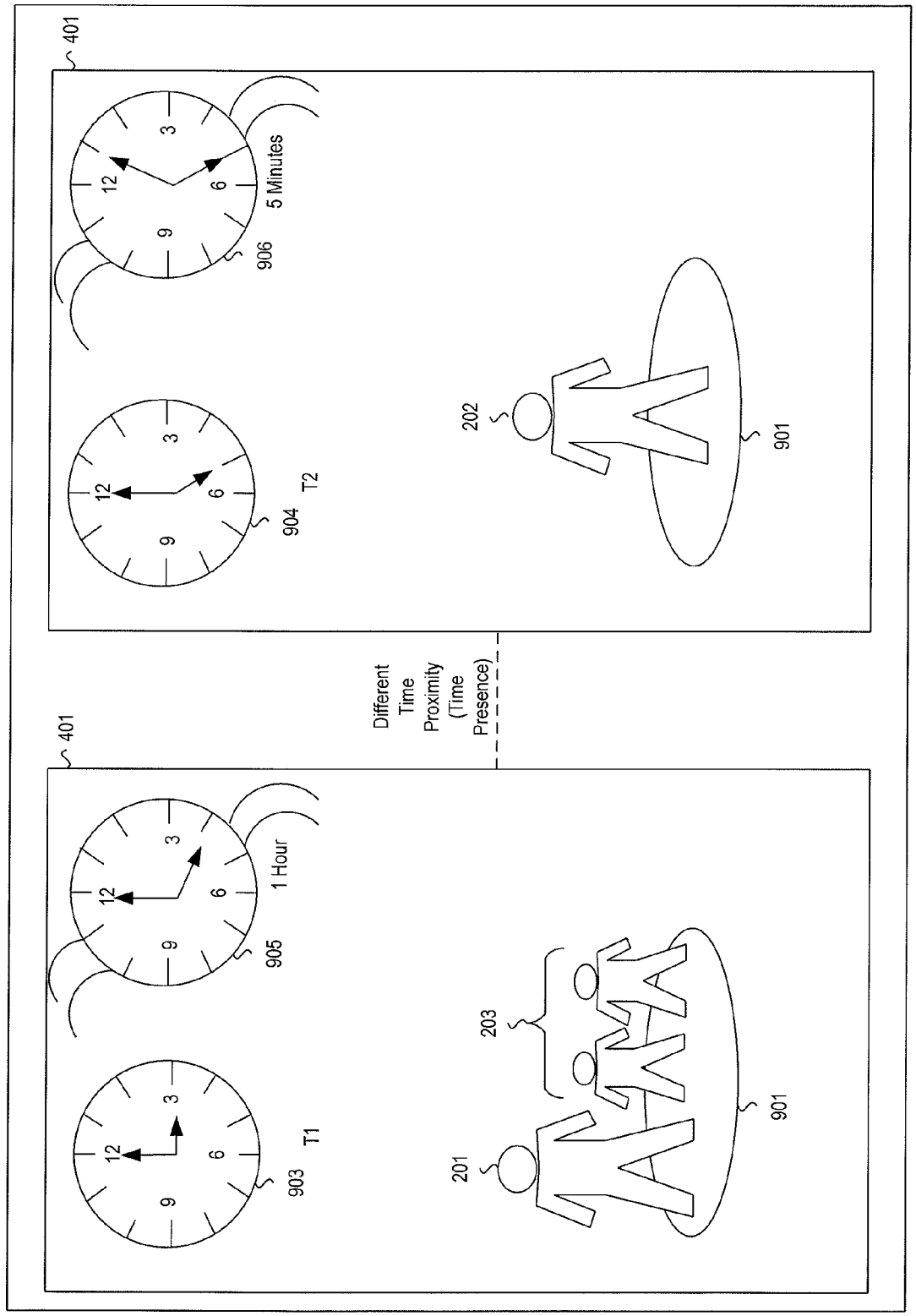
FIG. 10 is a diagram showing an example of time-presence proximity between entities and their locations in accordance with one embodiment of the present disclosure.

FIG. 10 is a time-presence proximity diagram that shows an example of the amount of time entities (in this example, people) are present in a particular location or room 401. In the example of FIG. 10, both sets of entities are in the room 401 at different times. On the left side of FIG. 10 is a first person 201 (or a group of persons 203) in position 901 in the room 401 at a first time T1 903 (here, 3 p.m.). The length of time the first person 201 (or the group of persons 203) is present 905 shows that the first set of individuals was present in room 401 for one hour. On the right-hand side of FIG. 10 is a second person 202 in the position 901 in the room 401 at a second time T2 904 (here, 5 p.m.). The amount of time the second person 202 was present 906 shows that the second individual was present in the room 401 for five minutes. Again, while persons 201, 202, 203 are depicted in this figure, this measure applies regardless of whether the entities are people, are people and objects, or are objects.

The relevance of the time-presence proximity determination is that if a second entity is in a particular location in which a first entity being infected with a disease is or was present, and the first entity was present in the room for only a short period of time (e.g., five minutes), there is a lower chance the second entity will be infected by the disease of the first entity. However, where the first entity having a disease spent a significant amount of time in that location, simply by the second entity entering the room, she bears a much higher risk of picking up and or becoming infected with the disease transmitted through contact with objects in the room or through airborne transmission by the first entity.

Figure 11:
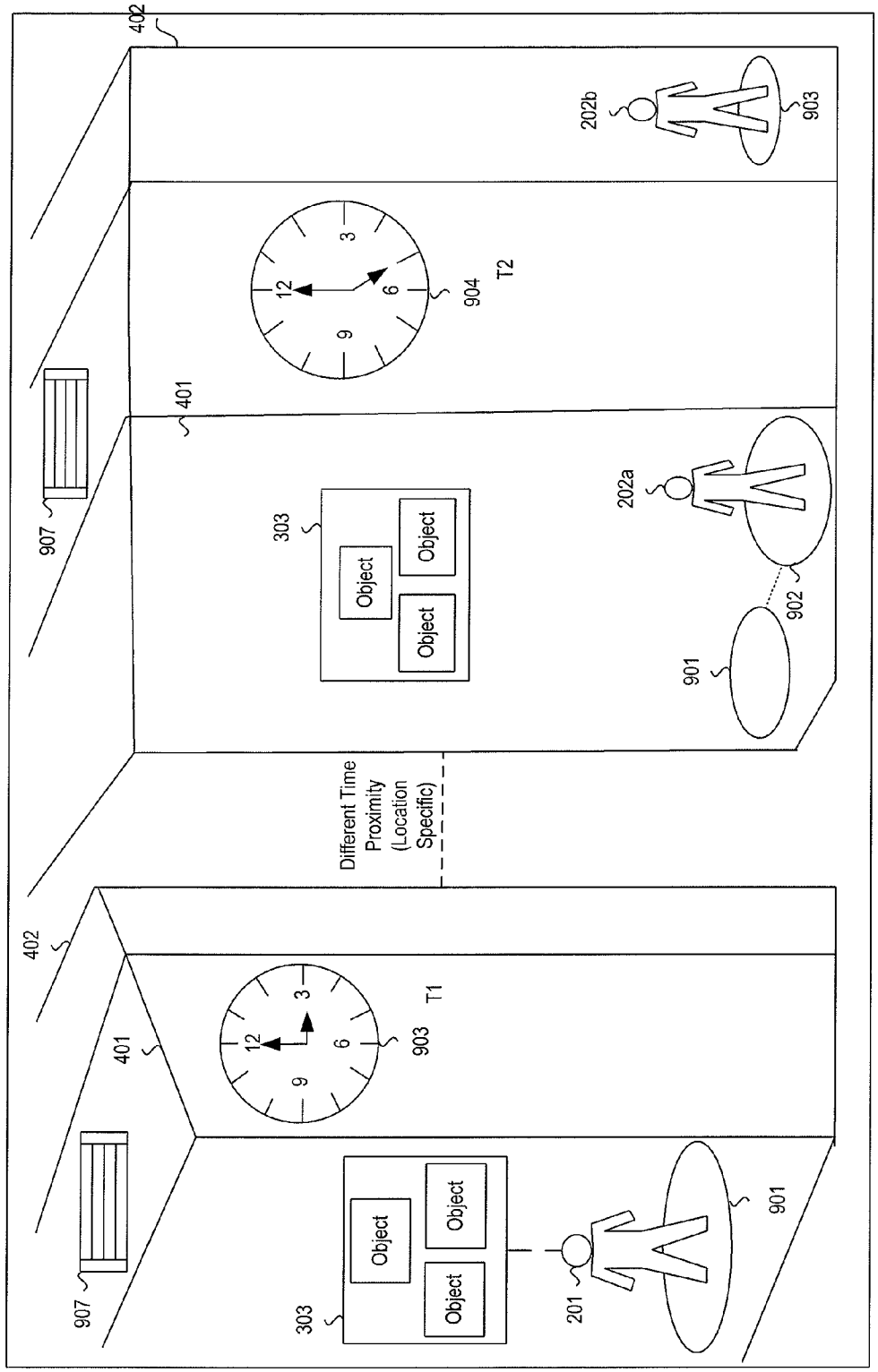
FIG. 11 is a diagram showing an example of location-specific different-time proximity between entities and their respective locations in accordance with one embodiment of the present disclosure.

Another consideration in the different time proximity is a location-specific time proximity, where the proximity of a second entity to a position within a location in which the first entity was formerly located is accounted for. FIG. 11 is a location-specific time proximity diagram that shows an example of the position of different individuals in a particular location at different times. On the left side of FIG. 11 is an individual 201 who is in position 901 in room 401 at time T1 903; room 401 having an adjoining room 402. On the right side of FIG. 11, the person 202a is in position 902 in room 401, and is thus in an area of the room 401 which is some distance away from the position 901 in which the first person 201 was located at a second time T2 904. Additionally, another individual 202b is in a room 402 adjoining the first room.

In the example of FIG. 11, if the patient 201 is infected with a disease at a first time T1 903 and was in contact with objects 303 located in a particular position 901 or area of the room 401, and such contact resulted in bodily fluids being transferred from the infected patient 201 to the objects within that area of the room, the relevance of location-specific time proximity becomes apparent when a second entity 202a, at a second, later time T2 904, enters the same room 401 in which the infected patient 201 formerly was located. The second entity 202a, however, is located at position 902 within the room 401. There is a high likelihood that any of the objects 303 that were contacted by both the infected patient 201 and the second person 202a could cause the second person 202a to become infected with the disease with which the first patient 201 was infected. Thus, taking into consideration the distance of the second person 202a from the area of the room in which the infected patient 201 was located (i.e., the distance between positions 902 and 901), and whether the second entity 202a contacts the objects 303 in the room 401, will help determine whether the second person 202a might be infected by the disease the patient 201 was infected with.

Furthermore, since some diseases are airborne, depending on the disease and the rate the disease spreads in a room, the distance of a second person 202a from a location in which a first patient 201 carrying an airborne disease was located may become relevant. The farther away the second person 202a is from the place in which the airborne disease from the first patient 201 was most concentrated may assist in determining whether the second person 202a becomes infected with the disease spread into the air by the infected patient 201. This applies regardless of whether the second person 202a is in the same room as the first person 201 was in, or whether the second person 202b is in a second room 402 near or connected to the first room 401 (e.g., connected by a vent connecting the rooms, air duct, or other passageway).

In considering the various kinds of proximity, successive instances of proximity often increase the likelihood that the relevancy of the relationship will increase. For example, each time entities are in proximity where one of the entities is infected with a disease, there will be an increased risk of becoming infected through repeated exposure to the disease. Similarly, if a doctor enters a room in which a patient has a disease, and that doctor comes into a close physical proximity to that patient on a number of successive visits, each successive visit increases the likelihood that the doctor will be exposed to the virus.

Intimacy Score

Referring again to FIG. 2, the proximity analysis system 207 includes a determine intimacy score use case 116 that retrieves proximity data from the determine physical component of proximity use case 114 and the determine time component of proximity use case 115 to create an intimacy score. The intimacy score generally is a normalized, quantitative assessment of components of the level of proximity pertaining to a relationship between one or more of the selected entity set and the corresponding one or more of the identified-as-related entity set. The intimacy score comprises an analysis of the proximity data, and assists in quantifying and visualizing relationships between the selected entities and their identified-as-related entity counterparts and describes the degree, level or strength of those relationships in numerical, indicia, or graphical form. The intimacy scores generated by the determine intimacy score use case 116 may also be employed in determining the relevancy of those relationships. The determine intimacy score use case 116 thus assigns an intimacy score to a relationship when two or more entities come into physical proximity with one another.

The determine intimacy score use case 116 generates the intimacy score by applying any one or combination of algorithms to evaluate the proximity data. The intimacy score is generally a function of proximity (i.e., physical proximity) (f(duration, proximity)) and duration (i.e., time proximity). While the intimacy score generally accounts for a number of factors (e.g., the various kinds of proximity and their considerations) in its weighing of the relationships between entities, the set selection preferences use case 117 may define the considerations which are used to calculate the intimacy score. For example, the intimacy score can be configured to consider only the physical proximity (e.g., how close two or more entities came within each other, whether there was contact between them, whether there was bodily contact) independent of the time proximity considerations. Similarly, the intimacy score may consider only the duration (time proximity) of the physical proximity, independent of how far apart the two or more entities were, and independent of what kind of physical proximity occurred between the entities.

Similarly, the determine intimacy score use case 116 can be configured to consider more than one instance of contact or other factors that may increase or decrease the intimacy score. As such, intimacy scores relative to successive and/or sequential instances of physical proximity may be combined to result in a cumulative intimacy score. In one embodiment, the cumulative intimacy score $f(N1, N2)$ is $1(1-f\_1(N1,N2))*(1-f\_2(N1, N2))* \ldots *(1-f-i(N1, N2))$. This embodiment treats each $f-i(N1, N2)$ as an independent interaction, and calculates the intimacy score from proximity data or other considerations as defined, for example, by the set selection preferences use case 117. Similarly, such an intimacy score can be computed by an alternative function based on a different combination of operators without departing from the scope and spirit of the present disclosure.

Based on the criteria considered, the intimacy score can be presented in a number of ways. For example, when calculating the intimacy score based on time proximity alone, the determine intimacy score use case 116 may employ an inverse exponential curve $(f(duration)=1-e^{\wedge}(-duration))$, indicating that as the duration in which entities are in proximity increases, the intimacy score rapidly approaches an upper bound. Similarly, when calculating the intimacy score based on physical proximity independent of time, the determine intimacy score use case 116 may employ an inverse logistic curve (or sigmoid curve) $f(distance)=1-1/(1+e^{\wedge}-distance)$, indicating that the intimacy score starts close to an upper bound with close proximity, then decays and levels off around 0. Furthermore, such calculations of intimacy scores can be combined via multiplication to arrive at an intimacy score which takes into consideration both the physical proximity and the time proximity factors (e.g., f(duration, distance)). Thus, in one embodiment the intimacy score might be presented as a number between 0 and 1, and in other embodiments, the intimacy score may be represented as a percentage, a different scale (e.g., 0-100), or some other ranking or labeling mechanism (e.g., A-Z).

Those skilled in the art will also recognize that the specific intimacy scoring function utilized to generate the intimacy score for the ITS system 10 disclosed herein may be changed or customized depending on the specific application or setting to which the ITS system 10 is applied. Thus, the intimacy scoring function can be provided as a built-in function, a selectable set of built-in functions, and/or be entirely customizable or replaceable as desired by the set selection preferences use case 117. Furthermore, in accordance with the visualization aspect of the present disclosure (discussed in greater detail below) the intimacy score generated by the determine intimacy score use case 116 may be represented in the form of a graphical icon, indicia, or other visual feature or effect. For example, the intimacy score could be represented as the relative width or thickness of a line.

Referring again to FIG. 1, the retrieve proximity use case 106 interacts with the proximity analysis system 207 to receive the analysis of the various aspects of interactions between and relationships among the entities. The proximity data provided by the proximity analysis system 207 includes analysis relating to the selected one or more entities from the select entity of interest use case 105, the relationships associated those selected entities, and the proximity data (including the physical component, the time component, and relevant intimacy scores) from the proximity analysis system 207 related to the interactions between the one or more entities of both the selected entity set and the identified-as-related entity set. The proximity data received by the receive proximity data use case 106 is used in the determine relevance of relationship use case 107 (discussed below).

Items of Information

A retrieve items of information use case 109 optionally retrieves information from a variety of sources 441, 442, 443, 444 that assist the ITS System 10 in analyzing the identified relationships between the selected entities. Such sources are generally databases that contain information useful in identifying the entities and other relevant information useful in understanding the relationship between the entities. This information is useful in determining that a relationship is relevant; the items of information relating to the entities can be forwarded to outside systems via the generate alerts use case 128 (discussed below). The databases can include an entity database 441 that contains identifying data relating to the various entities under analysis. For example, in the case of the entity being a person, the entity database 441 would include the person's name, date of birth, address, phone number, etc. In a medical setting, the entity database 441 might also include information such as patient identification number, medical conditions (e.g., diagnoses and symptoms), medical history, and insurance information. The entity database 441 may also include information related to object entities such as equipment identification numbers, the use of the equipment, the status, age, and condition of the equipment, and the location to which the equipment is assigned.

The retrieve items of information use case 109 may also interact with a contact database 442 that includes information such as known contacts, family or relationships of the entity in question. For example, with respect to a prison setting, the contact database 442 can include known aliases of a convicted prisoner, known partners who have been in association with the prisoner, known family members, and others who have shared prison cells with the prisoner in the current or past convictions.

A setting database 443 includes data related to the setting or environment in which the ITS system 10 is operating. For example, in a hospital setting, the setting database 443 would include a listing of the staff and those employed at the hospital, such as doctors, nurses, housekeeping staff, maintenance, kitchen staff, hospital security, etc., situations and alerts in the in the hospital (and related information such as severity, location, whether they are active or passive), as well as physical and/or structural information and data about the setting (e.g., size of the hospital, number of rooms, number of patients, etc.).

A condition database 444 includes information relevant to whatever setting the ITS system 10 is applied to. For example, in a medical setting, the condition database 444 may include forms of diseases, viruses, bacteria, and other types of maladies that can affect or infect entities within the medical setting. The condition database 444 may also include information such as the incubation period of the various diseases, the symptoms, groups that are at a heightened risk of contracting the disease, and how the disease is spread from one entity to another.

In addition to retrieving information from the various sources 441, 442, 443, 444, the retrieve items of information use case 109 also interacts with the historical database 400 to retrieve position information stored in the historical database 400 (for example, by the gather entity information use case 104 or other position source) and any other relevant information. Those skilled in the art will recognize that the retrieve items of information use case 109 could interact with any combination of sources of data in addition to those specifically discussed herein to obtain information relevant to the selected entities and/or relationships consistent with the present disclosure.

The information retrieved in the retrieve items of information use case 109 can relate to the entities which were selected as being entities of interest via the select entity of interest use case 105 (i.e., the selected entity set), to entities of corresponding relationships (i.e., the identified-as-related set) and/or to the relationships themselves. More generally, the items of information received can relate to the entities themselves such as the names or titles of the entities, the description, status, or condition of one, some, or all the entities, and prior history data of one, some, or all of the entities which would include information such as prior location (e.g., where each of the entities have been prior to their contact with the other entities), and with whom or with what each of the entities have been in contact prior to contact with the other entities.

For example, in a hospital setting, the items of information can relate to health record information relating to a first patient 201 who is classified as having a particular infectious disease stored in the condition database 444 and is identified as being administered a particular medication or treatment. Similarly, the item of information can also relate to a second patient 202 who is identified as having a different disease or condition. Similarly, the item of information can contain identification information regarding visitors stored in the contact database 442, including address and contact information which is often collected upon passing through a security entrance of a hospital. Further, the item of information can relate to medical personnel stored in a personnel database 443.

In a prison setting, for example, the item of information received in the retrieve items of information use case 109 can relate to which crime a particular prisoner 201 has been convicted of, the prisoner's sentence, jail time remaining, which other prisoners 202 the prisoner 201 is friendly with, which group or gang 203 the prisoner is associated with, and who are the other prisoners 202 or groups of prisoners 203 who have had conflicts with the prisoner 201.

The item of information can also relate to an object 301*b* such as a piece of equipment, and to which patient 201*b* the object is assigned (see, for example, FIG. 6). In the example of FIG. 6, equipment 301*b*, 301*c*, 302*c*, 302*d* is allocated to certain individual rooms 401*a*, 401*b*, 401*c*, 401*d* or to certain wings of the hospital. Similarly, in the prison setting, the object can be a piece of mail or property belonging to one of the prisoners. Similarly, the item of information can relate to an object or a group of objects such as serial information or identification information relating to specific pieces or classes of objects.

Furthermore, the item of information can relate to either a patient 201 who's information is stored in the entity database 441 and who is assigned to a particular location 401, such as two patients 201, 202 who are both assigned to share the same room 401. Similarly, the group of patients 203 can be classifications of patient groups 203, such as mothers who have just given birth, and both the patients individually and as a group, each mother 201 is assigned to a particular room 401 within the maternity wing 403. Similarly, the item of information can also apply to the prison setting, wherein either an inmate 201 or a group of inmates 203 are assigned to a particular prison cell 401 or a prison block 403 (e.g., two or more inmates 203 are assigned to share the same cell 401 or inmates 203 are identified with, grouped, or separated based on the severity of the crimes they committed).

Just as the item of information can relate to the entities involved in the interaction, the item of information can also relate to the specifics of the interaction itself, such as data which is used to identify whether conditions for an event have been satisfied, or data which would determine the conditions or rules for which the interaction is tracked. In the medical setting, such information could include medical data relating to how an infectious disease, virus, or bacteria spreads from one person to another.

For example, referring to FIG. 7, if a patient's 201*a* laboratory workup is found to contain an infectious disease which, according to the item of information received, is transmitted through the transfer bodily fluids 701 belonging to the patient 201*a*, and the only contact the patient has had is physical contact with a doctor 202*a* who was wearing gloves 702 during the interaction, the item of information relating to the conditions for which the disease would be transferred from the patient 201*a* to the doctor 202*a* would help one examining the interaction between the patient 201*a* and the doctor 202*a* to determine whether, based on the conditions that existed at the time of the contact, there is reason to suspect that the disease of the patient 201a has been spread to the doctor 202a. In the scenario where the doctor 202a is wearing gloves 702, because the item of information would require the disease to enter into a bodily orifice of the doctor 202a in order to spread the virus, and any contact between the doctor 202a and the patient 201a was non-bodily contact, an analysis of the interaction could conclude that the doctor 202a was not infected by the non-bodily contact between the doctor 202a and the patient 201a.

However, if the item of information identifies the disease to be airborne, then the analysis of the doctor's 202a interaction with the patient 201a would yield the conclusion that the doctor 202a was exposed to the airborne disease merely by being in proximity with the patient 201a, and thus one analyzing the interaction could conclude that the doctor 202a could have been infected with the virus. Furthermore, based on the identification of a possible communication of a virus from the patient 201a to the doctor 202a, one analyzing the proximity of the two entities 201a, 202a could also conclude that there is a likelihood that any one or more subsequent patients, visitors, and hospital staff that the doctor 202a has come into proximity with could have also been exposed to the airborne virus initially spread to the doctor 202a by the patient 201a. Such an example also applies to a scenario where a doctor that has been exposed to an airborne virus can spread that virus to any of the locations the doctor practices in. Further, since the virus is airborne, it is able to travel through the ventilation system of the hospital, and thus, any individuals within the hospital who are in any one of the locations in which the ventilation system reaches could also be infected by the same virus initially transmitted by the doctor.

Determining Relevancy

Returning to the ITS System 10 of FIG. 1, a determine relevance of relationship use case 107 utilizes the proximity data received in the retrieve proximity data use case 106 and/or information received via the receive items of information use case 109 to determine the effect or the relevancy of the proximity or relationship between the two entities. The relevancy of the relationship is determined based in part on the proximity and intimacy score data retrieved from the proximity analysis system 207 by the retrieve proximity data use case 106 with respect to preferences configured into the ITS system 10 in the set selection preferences use case 117. Thus, the proximity and intimacy score data may be analyzed to determine whether an event meets a pre-defined condition, whether proximity or intimacy score data meets or exceeds a pre-defined threshold, or generally what effect the relationship in question has had or will have on the ITS system 10 (e.g., other entities locations or relationships). In addition, the determine relevance of relationship use case 107 may provide information relative to the actual or potential current or future effect or impact of the particular relationship on other entities or relationships in or around the ITS system 10. For example, the determine relevance of relationship use case 107 may determine that a relationship (e.g., where one of the entities has an infectious disease), has a high likelihood of resulting in a spread of that disease to other people in the hospital. That is, based on the level of proximity and intimacy score of a relationship between two entities, it is likely that the second entity contracted the disease from the first entity. The determine relevance of relationship use case 107 could determine that subsequent relationships that the second entity develops could also result in the transmission of the disease to other entities. As described and exemplified throughout the present disclosure, including the description with respect to FIG. 17 above, the determine relevance of relationship use case 107 may determine that a particular relationship is relevant (or not) based on a variety of factors, thereby allowing the relationship relevancy system 5 to generally determine or predict the spread of infectious diseases or other conditions of interest to other areas of the hospital or to other entities associated with the hospital.

In one embodiment, if the determine relevance of relationship use case 107 determines that a relationship is relevant (e.g., reaches a certain threshold), the generate alerts use case 128 interacts with an alert system 208 to issue a notification that a relationship of particular nature exists. The notification from the alert system includes, for example, sending messages to select entities or the user/operator 130, instructing entities to take a particular course of action, activating systems that are connected to the ITS system 10 (e.g., to combat the situation), an alarm or other broadcast of information system-wide (e.g., to warn of a infectious disease outbreak), or forcing a change in the entity selection criteria.

In another example, in a prison setting, the set selection preferences use case 117 receives criteria that certain prisoners are supposed to be in their prison cells at a certain time. Prisoners are the entities selected to be in the selected entity set. Similarly, the prison cells assigned to each prisoner are selected to be in the identified-as-related entity set. The proximity analysis system 207 thus determines whether each entity is found in their prison cell at the scheduled time; this proximity information is retrieved by the retrieve proximity data use case 106. The determine relevance of relationship use case 107, based to the rules set by the set selection preferences use case 117, determines that a relationship between a prisoner and his prison cell is relevant when that prisoner is not found to be in proximity with his assigned prison cell at the programmed time. Based on the absence of the prisoner from his assigned prison cell, the determine relevance of relationship use case 107 determines that there has been a breach in the prison security system. In such a circumstance, the alert system 208 signals an alarm via the generate alerts use case 128 and sends an alert to prison security staff and local authorities that the certain prisoner is not where he should be. The retrieve items of information use case 109 retrieves from the various databases items of information such as the prisoner's picture, his fingerprints, a copy of his case file including whether his conviction was for a violent crime, past associations, etc. Some or all of these items could be broadcast to relevant parties via the alert system 208. Also, upon detecting the potential breakout, the alert system 208 communicates with the security system (not shown) to initiate a lockdown of all entrances and exits from the prison, and to raise the security level in the prison to a higher setting. Additionally, the visualize proximity between entities use case 112 could be used to display on a visual map of the prison grounds where (if present) the prisoner is located so that he can be recaptured.

Similarly, the determine relevance of relationship use case 107 may also project behavior or develop a profile of entities based in part on determined relationships of the entities, as well as predict the deviation from that behavior or profile. In one embodiment, the determine relevance of relationship use case 107, in conjunction with the information received from the one or more of the information sources 400, 441, 442, 443, 444 determine behavior patterns or profiles of entities in the system by accumulating knowledge of typical activities and movement patterns (e.g., daily routines, positions, time schedules, movement under particular conditions) for hospital staff including doctors and nurses or certain pieces of equipment (e.g., oxygen tanks, stretchers, etc.). Such association of activity with particular entities results in a profile for such entities. Thus, the determine relevance of relationship use case 107 or the relationship relevancy system 5 as a whole has the ability to predict deviations from the typical behavior or profile based on, for example, recently detected movement or relationship development. For example, if the relationship relevancy system 5 has access to a profile regarding a group of nurses, and the determine relevance of relationship use case 107 notes that one of the nurses traverses a particular hallway that none of the nurses in the group typically uses, the determine relevance of relationship use case 107 may determine that the nurse has a high probability of (a) not being permitted in that area of the hospital; and (b) visiting an off-limits, secured room at the end of the hallway. As such, the determine relevance of relationship use case 107 could make such determination and initiate appropriate action or alerts prior to the nurse ever reaching the secured room or leaving the hallway. Those skilled in the art will recognize that such profiling and behavior prediction and deviation features could be applied to a number of different settings, including, for example, law enforcement efforts (e.g., FBI criminal profiling).

Visualization of Relationships

A visualize proximity use case 112 interacts with a relational visualization system 205 to obtain a graphical representation of the relevant entities and their relationships, proximities and associated intimacy scores on a display or map corresponding to the physical environment or the setting in which the ITS system 10 is operating or to which it is applicable.

Figure 12:
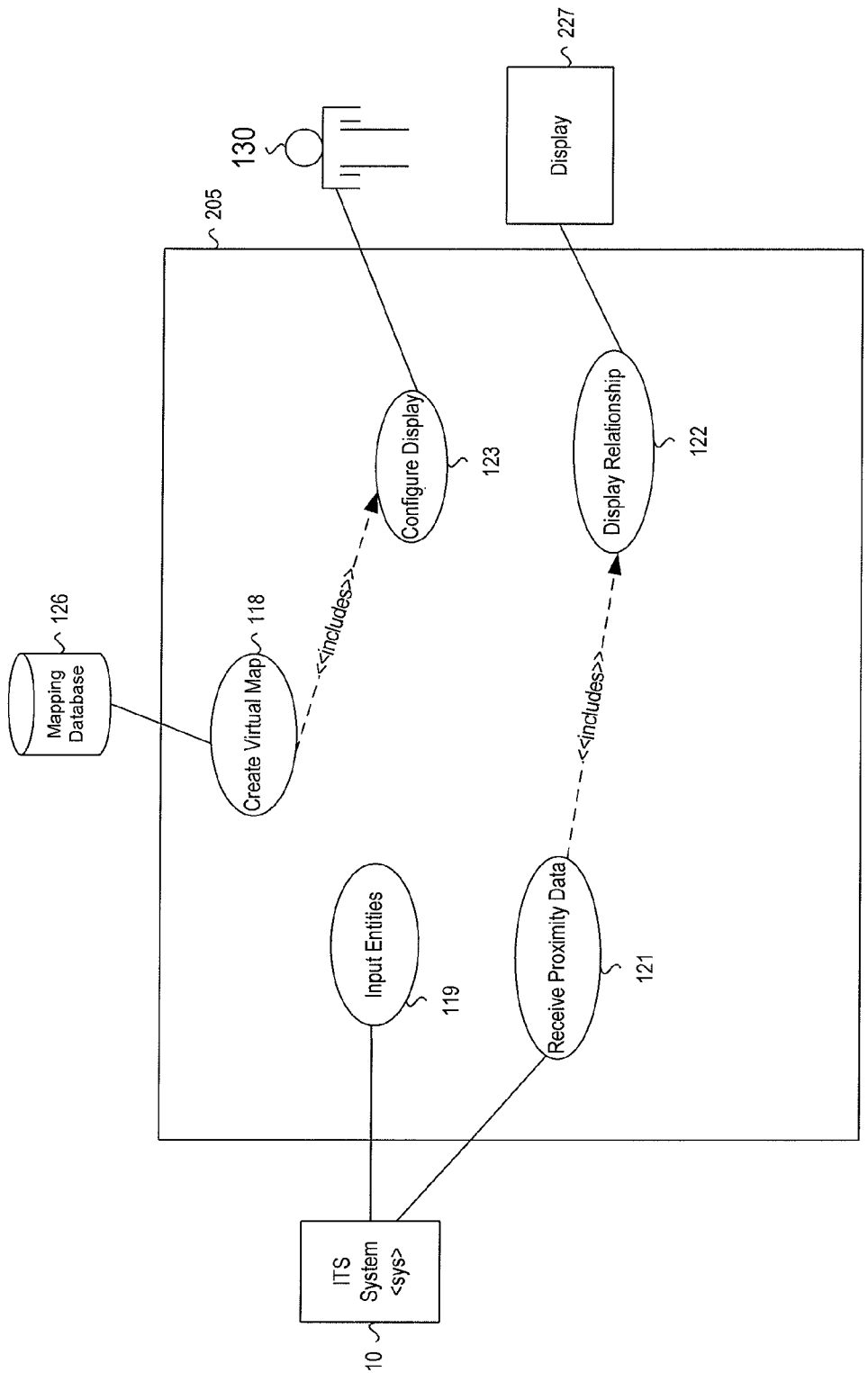
FIG. 12 is a use case diagram of the relational visualization system in accordance with the embodiment of FIG. 1.

FIG. 12 is a use case diagram of the relational visualization system 205. The relational visualization system 205 includes a create virtual map use case 118 that accesses a mapping database(s) 126 to generate a virtual map of the physical environment or setting (e.g., hospital, office building, prison, etc.) to which the ITS system 10 is applicable. The virtual map is created using any combination of mapping software generally known in the art.

An input entities use case 119 interfaces with the ITS System 10 to input the entities being monitored and tracked by the ITS system 10 into the virtual map to create a virtual relationship display. The entities are displayed on the virtual map as icons, graphical symbols or other indicia. In addition, icons, graphical symbols or other indicia denoting items of information relevant to or associated with one or more of the entities may be included in the virtual relationship display. For example, the virtual relationship display may graphically distinguish between an entity being an individual and an entity that is an object, or between an entity that is a patient and an entity that is a doctor.

A receive proximity data use case 121 interfaces with the ITS system 10 to retrieve proximity data (e.g., level of proximity data, intimacy score data) generated by the proximity analysis system 207. Additionally, a display relationship use case 122 displays the relationships between entities on the virtual relationship display, permitting a visual representation of the relationships present in the system, between which entities, and at which positions or location in the system or map. In one embodiment, the entities displayed comprise each of the entities in the selected entity set according to the set selection preferences use case 117, and the entities in the identified-as-related entity set which are identified in the identify relationships use case 113 as being related to the respective entities in the selected entity set. These settings can be modified by a configure display use case 123 (discussed below) to include a broader set of entities to be included in either set, or a narrower set. The display relationship use case 122 interfaces with a display 132 for presentation to the user or operator 130.

The relationships may be represented on the virtual relationship display by displaying indicia indicating the relationship between the entities. The indicia can be a line connecting the entities, or it can be some other marker or identifier showing the user that the selected entities are somehow related. The indicia representing the relationship between any given set of entities may also be used to visually indicate the proximity between those entities and optionally may associate their intimacy score. In an embodiment where the intimacy score is applied to the indicia, a larger score can represent a stronger connection, and a lower score can represent a weaker connection. Such intimacy scores may be monitored and updated as relationships between the entities changes and is monitored in real-time. However, as discussed above, the intimacy score is only one of the different measurements of proximity that can similarly be represented by the indicia.

For example, the indicia representing the relationships can reflect an infection or virus being monitored. That is, if the interactions forming the relationship between the entities (displayed as indicia) comprise the types of interactions that would be conducive for the disease or virus to be transmitted from one person to another, then that increased risk can be reflected by modifying the indicia to represent the increased risk. If, for example, the indicia are represented by a line connecting two entities, an increased risk of infection could be represented by a thick line as opposed to a thin line. Conversely, a relationship having a lower risk of infection could be represented by a thin line or no line.

Similarly, the display relationship use case 122 may present the relationships as a social network visualization graph 720 (see FIG. 13) or similar display. In one embodiment, the display may include the entities, relationships and/or their corresponding, relative locations, but may exclude the virtual map of the area being tracked. The graph may contain entities and their relationships (including relationships with regard to locations in the ITS System 10), or it may contain displays of other criteria such as class, condition, date, or time (e.g., as described in the metaclass diagram of FIG. 15). The configure display use case 123 (discussed below) can determine what are the items or the elements that populate the graph.

Figure 13:
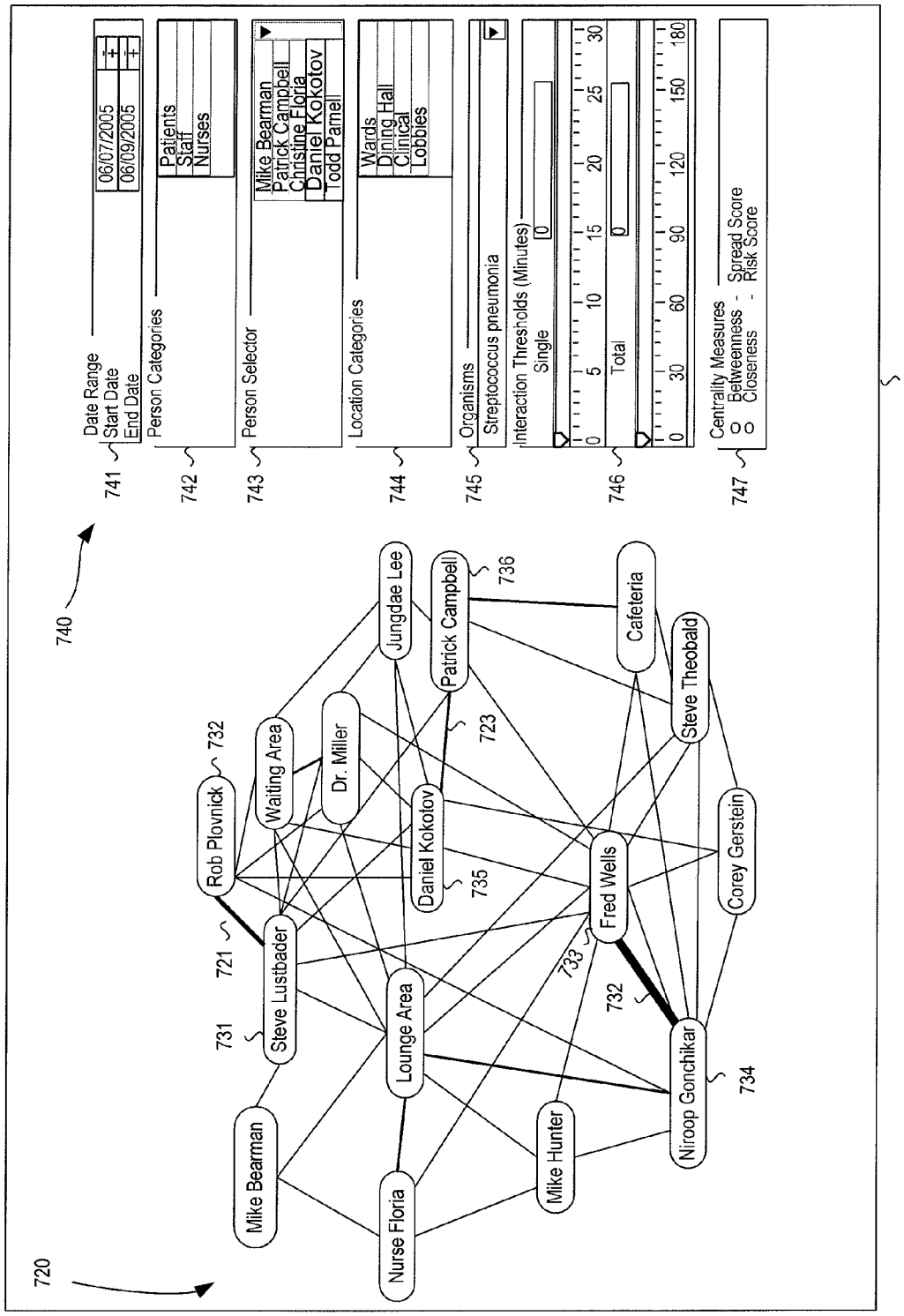
FIG. 13 is an example of a virtual relationship display including a social network visualization graph in accordance with the present disclosure.

FIG. 13 shows an example of a social network visualization graph 720 as part of a virtual relationship display 700, in which the display relationship use case 122 can display the relationships between selected entities and those entities identified-as-related to the selected entities. In the example of FIG. 13, nodes represent the entities being analyzed, and the indicia (e.g., lines) between nodes represent the relationship between entities and describe the proximity between the entities. In the example of FIG. 13, line thickness represents the level of the proximity and/or the intimacy score with respect to any particular relationship. However, as discussed above, other indicia can be used. Relationships having a higher intimacy score or level of proximity are represented with a thicker line, while relationships with a lower intimacy score or level of proximity are represented by a thinner line. The social network visualization graph 340 can be viewed in real time or based on historical information. In one embodiment, when viewed in real time, as the intimacy score or proximity between the entities strengthen or weaken, the indicia on the graph representing the relationship, proximity and/or intimacy score changes in a corresponding manner. It should also be understood that the level of proximity and/or intimacy score represented on the relationship visualization display may be presented in any one or combination of formats and may be relative to the other levels of proximity/intimacy score on the display. For example, the thickness of the lines representing the various relationships in FIG. 13 may be relative to the other relationship lines in the social network visualization graph 720. In another embodiment, the relationship visualization display 700 may include more precise indications of the actual or relative intimacy score of any given relationship.

In FIG. 13, one instance of proximity or intimacy score between entities is represented by line 721 which represents a relationship between two nodes, Steve Lustbader 731 and Rob Plovnick 732. The line 721 indicates that Steve Lustbader 731 and Rob Plovnick 732 are or have been in proximity to each other, and thus have a relationship. The relative thickness of the line 721 indicates that there is a relatively high level of proximity or intimacy score between these two entities. In a medical setting (e.g., the ITS System 10 is configured to track a disease) the thickness of line 721 may indicate that if one of these individuals were infected with a particular disease, the other individual would likely have been exposed and would be at a high risk of transmission.

The virtual relationship display 700 of FIG. 13 also allows a user to compare relationships between entities being tracked. For example, the line 722 connecting the nodes Fred Wells 733 and Niroop Gonchikar 734 is thicker than the line 723 connecting Daniel Kokotov 735 and Patrick Campbell 736, indicating a higher intimacy score and therefore higher risk of exposure/transmission.

The virtual relationship display 700 of FIG. 13 also includes examples of portions of the user interface configured in the configure display use case 123 of FIG. 12. The user interface allows a user monitoring the interactions between the entities tracked in the ITS System 10 to customize the virtual relationship display 700, as described above. As shown in the example of FIG. 13, a set of panels 740 on the virtual relationship display 700 presents various options that a user interacting with the configure display use case 123 select. Such options include, for example, date range 741, person categories 742, person selector 743, location categories 744, organisms 745, interaction thresholds 746, and centrality measures 747. Those skilled in the art will recognize that the configuration panels may be presented on the same or a separate display as the social network graph, virtual relationship display 360 or other relationship map.

In addition to displaying relationships between entities, the display relationship use case 122 may also present relationships between entities by representing those relationships as indicia being associated with a particular location or area on the virtual relationship display where the interactions forming those relationships took place. Thus, interactions between entities where such interactions (i.e., proximities) take place in different locations may be accounted for. Similarly, where there is a proximity between more than one set of entities (e.g., a first set of entities and a second set of entities), each set having a relationship and a proximity, the cumulative effect of the proximities between the entity sets on the area in which the proximity occurred can be represented by indicia associated with that particular area or location on a virtual relationship display. For example, if there are multiple relationships in an infectious disease outbreak where the proximity between a patient having an infectious virus and another person occurred in a particular room or area of the hospital, that room could be marked on the virtual relationship display (e.g., by color, by a number indication of level, or by other indicia) to indicate that the particular room or area was to be considered an "infected" room or a "hot zone". Similarly, based on the information about the virus being considered, a radius around the "infected" room might also be drawn to indicate that there is a higher likelihood of infection by being in those areas.

Figure 14:
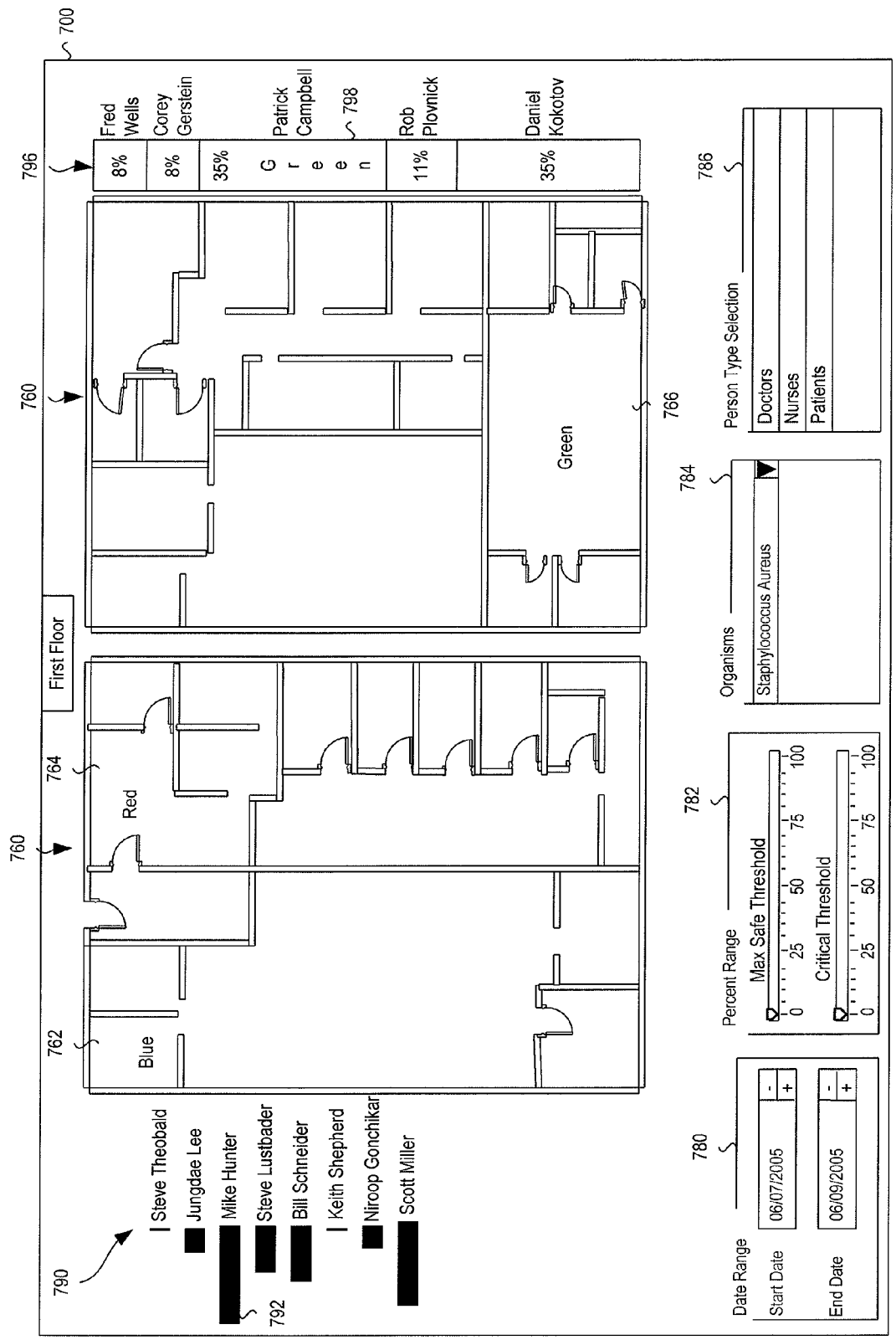
FIG. 14 is an example of a virtual relationship display including a physical region visualization display in accordance with the present disclosure.

FIG. 14 is an example of a virtual relationship display 700 that includes an example of a physical region visualization graph 760, in which the display relationship use case 122 presents the proximity between entities and/or the intimacy scores with respect to locations displayed on the virtual relationship display in which the proximity between the entities took place. Although the example of FIG. 14 depicts the region as a floor plan of a particular area of a building, it should be understood that the virtual relationship display may present different floor plans representing various areas within a building, and may also present a three-dimensional representation of a building, among other configurations. In FIG. 14, the locations shown on the display are shown as rooms, and the indicia describing the proximity between the entities are colorations of those rooms.

For example, in a hospital setting where one of the entities was infected with the Ebola virus, various rooms are displayed in the physical region visualization graph 330. Each room is associated with an intimacy score or proximity level of those instances of contact that occurred in each of the rooms. While in the example of FIG. 14, coloring or shading is used to represent the intimacy score or proximity levels relating to each room, other embodiments may display other indicia or markings to describe the proximity and/or intimacy scores (e.g., numbers indicating the intimacy score of each room or region, or letters indicating the level of proximity, etc.) Similarly, the set selection preferences use case 117 may determine whether the proximity level and/or intimacy score was shown, or whether the visualization is configured to simply show the number of instances of contact between the related entities.

In the example of FIG. 14, if the physical region visualization graph 760 is configured to represent the number of instances of contact, room 762 is colored blue, indicating that one or more instances of contact between a selected entity who has tested positive for the virus and entities identified-as-related to the selected entity took place. Room 764 is colored red, indicating that a large number of instances of contact took place there. Where no instances of contact between a person infected with the Ebola virus and another entity took place, the room is colored green, as is seen in room 766. Other rooms on the physical region visualization graph 760 may not be colored at all, indicating that there was not contact of any sort in those rooms, that the infected person was not in those rooms, or that no entity entered those rooms at all.

Similarly, the coloring of the rooms 762, 764, 766 in FIG. 14 can represent intimacy scores or proximity levels corresponding to the relationships that took place in a particular location. In this embodiment, the intimacy scores of each relationship is combined to form a cumulative intimacy score which can be calculated with regard to each room, and the level of the cumulative intimacy score of each room can be represented by a color. Thus, in the example of FIG. 14, room 762 is colored blue to indicate an elevated cumulative intimacy score with regard to that room. The red coloring of Room 764 represents a very high cumulative intimacy score with regard to that room, while the green coloring of 766 represents a room having a low intimacy score.

Similar to the social network graph 720 in FIG. 13, the physical region visualization graph 760 can be viewed in real time or in view of historical information. When viewed in real time, as the intimacy score with regard to each room strengthens or weakens, the color attributed to that room changes accordingly. In addition, the virtual relationship display 700 of FIG. 14 includes examples of interactive portions of the user interface configured via the configure display use case 123. Such user configuration options include the date range 780, the percent range 782, organisms 784, and person type selection 786. Other configuration options may be presented, as described above.

Additionally, other features can be incorporated into the virtual relationship display 700 based on the settings set in the set selection preferences use case 117. One such feature is a risk graph 790, which in the medical setting displays those entities most at risk of being exposed to or acquiring an infection from a region or set of regions (as opposed to from another entity). The risk graph 790 can be formatted as a bar graph, with each bar corresponding to an at risk entity, and the size of the bar proportional to the level of risk as determined by the time spent in potentially infected locations (taking into account social network effects). In the example of FIG. 14, entities not already known to have the potential infection are included in the risk graph 790. In FIG. 14, the bar referring to "Mike Hunter" 792 is at high relative risk of exposure/transmission, whereas "Steve Theobald" and "Keith Shepherd" are at low relative risk.

The risk graph 790 operates in two modes: global, and local. In global mode, it shows the risk of exposure to or acquiring an infection from the regions in the facility. In local mode, based on selecting a region or set of regions, it would show the risk of exposure to and transmission of an infection only in that region(s).

Another feature that can be incorporated into the visualization based on the settings set in the set selection preferences use case 117 is an infection contribution gauge 796. The infection contribution gauge 796 displays which entities are contributing to the potential infection level of particular regions. The infection contribution gauge 796 is a bar that can be broken down into colored bands, for example, the green color band 798 for Patrick Campbell. Each band corresponds to an entity contributing to the potential infection level, with the size of the band representing the fraction of the total potential infection level which that entity is contributing. The contribution for each entity is based on proximity data and/or intimacy score data. Similar to the risk graph 790, the potential infection contribution gauge 796 operates in global mode and local mode. In global mode, it would show contributions to the overall potential infection level of the facility. In local mode, based on selecting a region or set of regions, it would show contributions to the potential infection level of that specific region(s).

The virtual relationship display 700, its entities and their relationships may be displayed by the display relationship use case 122 on any display device 227 via the visualize proximity use case 112 of FIG. 1. Such display devices are generally known in the art, and omission of a detailed discussion thereof herein should be not considered limiting, but should be understood to include, for example, a computer screen or monitor in connection with the ITS system 10.

The configure display use case 123 allows a user of the ITS system 10 to interact with the virtual map via a mouse, keyboard, touch-screen interface or any other means generally known in the art to input additional information to the system. A user 130 may also select entities or aspects of the environment displayed on the virtual relationship display 700 for further investigation or alternate display, or otherwise manipulate and interact with the virtual relationship display 700 via the configure display use case 123. In addition, the configure display use case 123, for example, allows for the panning and zooming of a graph or display on the display 227, re-centering the layout of the display around entities selected, and re-positioning of the entities on the display by the user to facilitate analysis. Similarly, as described above, the configure display use case 123 allows a user to change the parameters as discussed above in the set selection preferences use case 117 to display alternate display outputs based on the new configuration settings; this could include altering one of the configuration setting as discussed in the metaclass diagram of FIG. 15 to include a different set of entities in the display output. The configure display use case 123 can allow for the manipulation of indicia, sizes, and colors of entities in the ITS system 10.

In one embodiment, the user 130 of the relationship relevancy system 5 makes manual determinations about one or more aspects of the information generated to obtain relationship and/or relevancy information. For example, the user 130 (e.g., a hospital administrator) may manually identify entities of interest, determine positions of those entities and/or identify relationships of those entities. Such manual determinations may be made via observations or experience of the user 130. The user 130 may also draw manual conclusions regarding the level of proximity of the entities in a relationship and provide or obtain items of information about those entities, including, for example, human knowledge or a traditional (e.g., paper) filing system 446 (see FIG. 17). The user 130 may also draw manual conclusions about the relevancy of the relationships based on the proximity data and items of information obtained.

The network 900 is used to facilitate communication between the various devices, modules and components of the relationship relevancy system 5. The network 900 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network, transmission channel or medium capable of facilitating communication between the devices, modules and other components of the relationship relevancy system. The network may be wired, wireless or a combination thereof. Wired connections may be implemented using Ethernet, Universal Serial Bus (USB), RJ-11 or any other wired connection generally known in the art. Wireless connections may be implemented using wifi, wimax, bluetooth, infrared, cellular networks, satellite or any other wireless connection methodology generally known in the art. The network may be implemented in a client-server, token-ring, peer-to-peer manner or any other network topology known in the art. Additionally, several networks may work alone or in communication with each other to facilitate communication in the network 900. Various networking standards may be employed for allowing UE 101 to communicate with the network 900, such as EDGE, 3 G and/or 802.11.

Figure 18:
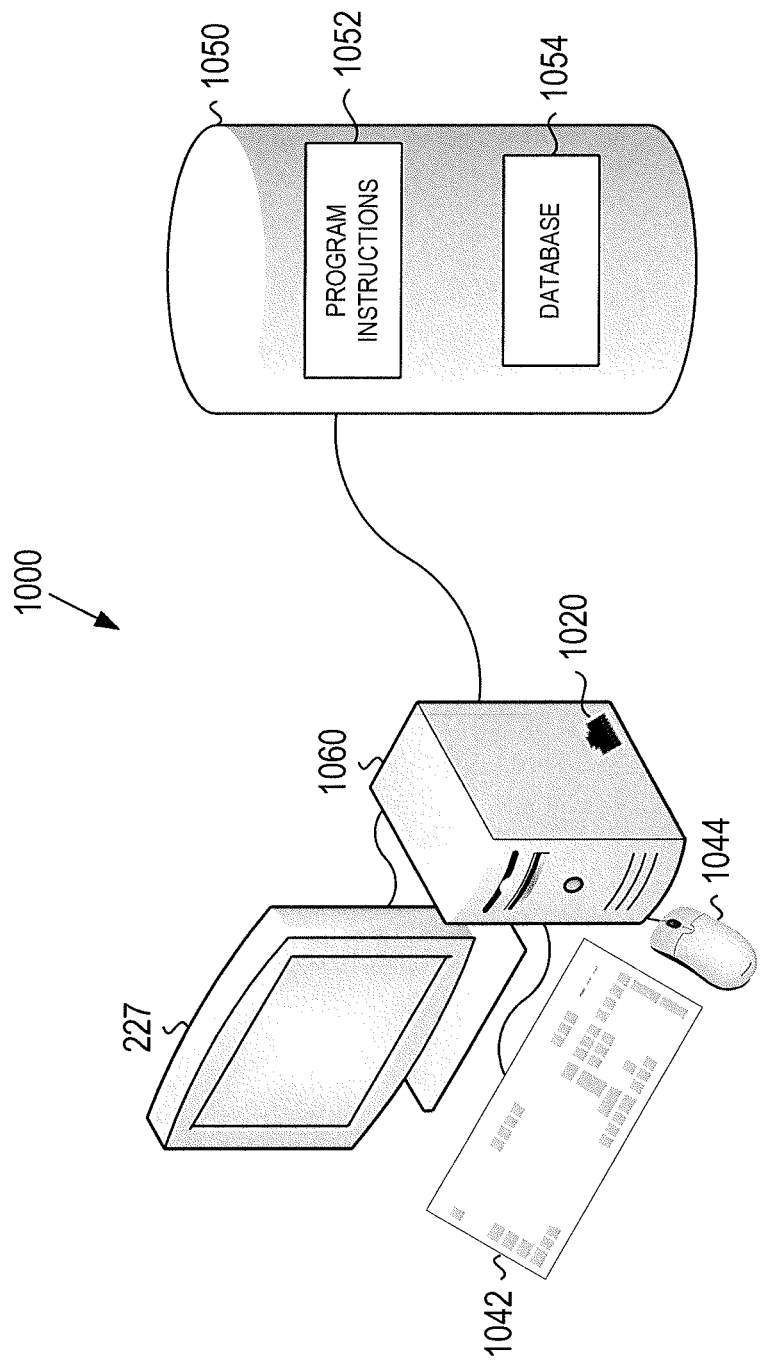
FIG. 18 is a block diagram of a computer system for realization of the relationship relevancy system of FIG. 17.

FIG. 18 is a block diagram illustrating a computer system 1000 for realization of a computer-implemented apparatus that may form all or a portion of one or more implementation(s) or embodiment(s) of the present disclosure. The computer system 1000 includes a computer 1060, a keyboard 1042, a mouse 1044, and a display device (e.g., computer monitor) 227 (see also FIGS. 1, 12 and 17) through which the computer 1060 may receive input/provide output, for example to a user, operator or another computer or system (not shown). Input/output devices such as the display device 1040, keyboard 1042, the mouse 1044, and other means or mechanisms (e.g., touch screen interface) through which interaction with the computer system 1000 may occur are generally known in the art, and a detailed discussion thereof is omitted here for convenience only and should not be considered limiting. The computer 1060 includes a network port 1020 for connecting the computer to an internal or external network, such as, for example the network 900. The computer 1060 is connected to a storage device 1050 that includes program instructions 1052 for software application(s) that provides the logical functions of the computer-implemented apparatus and/or method(s) of the present disclosure. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Server™, Microsoft SQL Server CE™, IBM DB2™, mySQL or postgreSQL.

Figure 19:
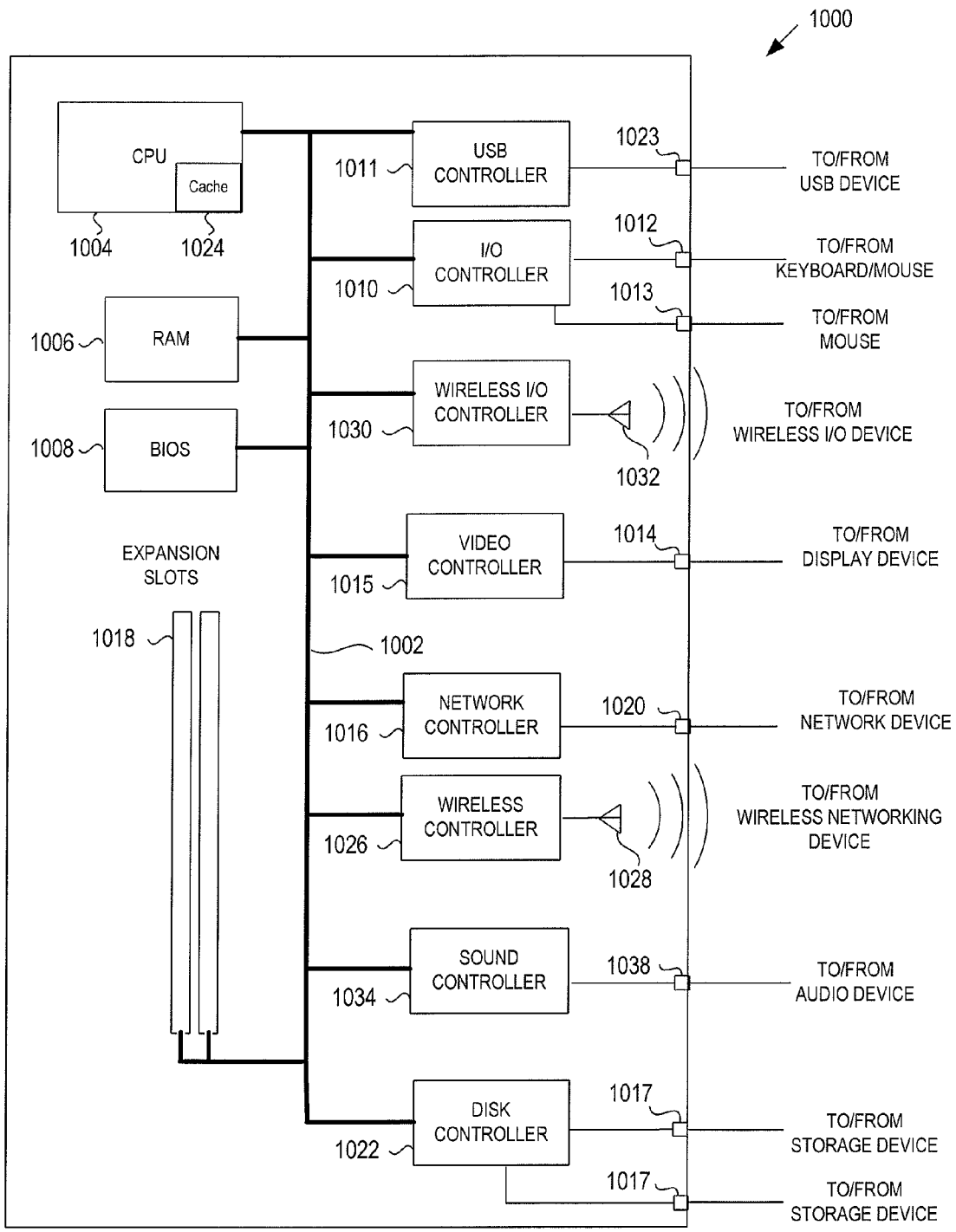
FIG. 19 is a block diagram of a computer system for realization of the relationship relevancy system of FIG. 17.

FIG. 19 is a block diagram illustrating a computer architecture or system 1000 through which the embodiments of the relationship relevancy system 5, including the interaction and tracking surveillance system 10, the position determination system 204, the proximity analysis system 207 and/or the relational visualization system 205 may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and/or pointing device (e.g., mouse, touch pad) (see FIG. 18) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewire adapters, or biometric devices (not shown), may be utilized through the I/O controller 1010. A display device 227 (see FIGS. 1, 12, 17 and 18) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. These devices are generally well-know to those skilled in the art, and a detailed discussion thereof is omitted here for convenience only and should not be considered limiting.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

What is claimed is:

1. A method of identifying a relevance of a relation between at least two entities, the method comprising:
receiving data relating to one or more of the entities;
determining whether a proximity between the two entities exists;
developing an intimacy score at least including a level of the proximity between the entities, and
determining the relevance of the proximity between the entities based on the intimacy score and the data received, the relevance of the proximity at least being used to determine whether additional actions with regard to at least one of the entities is appropriate when the intimacy score reaches a predetermined level based on the particular data received relating to one or more of the entities and at least includes determining a probability that an event will occur, the event at least including an infectious disease transmission from one entity to another.

2. The method of claim 1, wherein the proximity between the entities results from a co-location of the entities at an instance of time.

3. The method of claim 1, wherein the level of the proximity is based in part on the separation between the entities.

4. The method of claim 1, wherein the level of the proximity is based in part on the duration of time in which the entities are in proximity to each other.

5. The method of claim 1, wherein the level of the proximity is based in part on the frequency in which the entities are in proximity to each other.

6. The method of claim 1, wherein the level of the proximity is based in part on the time elapsed between successive occasions of contact between the entities.

7. The method of claim 1, wherein the level of the proximity is based in part on whether there is a physical contact between the entities.

8. The method of claim 1, wherein the proximity between the entities results from a co-location of the entities at different instances of time.

9. The method of claim 1, wherein the relevance of the proximity is based on a duration of time elapsed from a first time one of the entities is in a location to a second time another of the entities is in the location.

10. The method of claim 1, wherein the relevance is the determination of whether one of the entities is at risk of transmitting an infectious disease.

11. The method of claim 10, wherein one of the entities is determined to be exposed to an infectious disease.

12. The method of claim 1, wherein the relevance of the proximity relates to one or more of a security issue, a theft, an access, and a prediction of behavior.

13. The method of claim 1, further comprising:
- displaying one or more indicia representing the proximity between the entities, the indicia indicating a connection between the entities;
- modifying an attribute of the indicia in accordance with changes in the extent of the proximity between the entities.

* * * * *